(12) United States Patent
Keeney et al.

(10) Patent No.: US 12,157,335 B2
(45) Date of Patent: Dec. 3, 2024

(54) AXLE ASSEMBLY

(71) Applicant: ArvinMeritor Technology, LLC, Troy, MI (US)

(72) Inventors: Christopher Keeney, Troy, MI (US); Tomaz Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/172,826

(22) Filed: Feb. 22, 2023

(65) Prior Publication Data

US 2023/0202233 A1 Jun. 29, 2023

Related U.S. Application Data

(62) Division of application No. 16/901,704, filed on Jun. 15, 2020, now Pat. No. 11,618,281.

(51) Int. Cl.

| *B60B 35/12* | (2006.01) |
| *B60B 35/16* | (2006.01) |
| *B60K 7/00* | (2006.01) |
| *B60K 17/02* | (2006.01) |
| *B60K 17/04* | (2006.01) |

(52) U.S. Cl.
CPC ............ *B60B 35/122* (2013.01); *B60B 35/16* (2013.01); *B60K 17/02* (2013.01); *B60K 17/043* (2013.01); *B60K 7/0007* (2013.01)

(58) Field of Classification Search
CPC ....... B60B 35/122; B60B 35/16; B60K 17/02; B60K 17/043; B60K 7/0007
See application file for complete search history.

(56) References Cited

U.S. PATENT DOCUMENTS

| 5,558,174 | A  | * | 9/1996 | Avitan | B66F 9/07595 |
| | | | | | 74/420 |
| 6,328,123 | B1 | * | 12/2001 | Niemann | B60T 1/065 |
| | | | | | 180/65.6 |
| 8,794,280 | B2 | | 8/2014 | Flory et al. | |
| 9,278,587 | B2 | | 3/2016 | Honig | |
| 9,283,818 | B2 | | 3/2016 | Keeney et al. | |
| 9,315,077 | B2 | | 4/2016 | Flory et al. | |
| 9,333,813 | B2 | | 5/2016 | Tiziani et al. | |

(Continued)

FOREIGN PATENT DOCUMENTS

| CN | 203427602 U | 2/2014 |
| CN | 108528185 A | 9/2018 |

(Continued)

OTHER PUBLICATIONS

European Examination Report dated Sep. 25, 2023 for related European Appln. No. 21173054.4; 5 Pages.

(Continued)

*Primary Examiner* — Jacob B Meyer
(74) *Attorney, Agent, or Firm* — Brooks Kushman PC

(57) ABSTRACT

An axle assembly having an electric motor, a wheel end assembly, and a reduction gear module. The electric motor may have a rotor that is rotatable about a first axis. The wheel end assembly may be rotatable about a second axis that may be disposed above the first axis. The reduction gear module may transmit torque between the electric motor and the wheel end assembly.

17 Claims, 15 Drawing Sheets

(56) References Cited

U.S. PATENT DOCUMENTS

| | | | |
|---|---|---|---|
| 9,428,016 B2 | 8/2016 | Keeney et al. | |
| 9,452,644 B2 | 9/2016 | Keeney et al. | |
| 9,452,645 B2 | 9/2016 | Polubinski et al. | |
| 9,481,213 B2 | 11/2016 | Keeney et al. | |
| 9,517,663 B2 | 12/2016 | Lewandowski et al. | |
| 9,539,865 B2 | 1/2017 | Akin et al. | |
| 9,597,931 B2 | 3/2017 | Dean et al. | |
| 9,713,854 B2 | 7/2017 | Zhai et al. | |
| 9,809,065 B2 | 11/2017 | Polubinski et al. | |
| 9,815,340 B2 | 11/2017 | Trostle et al. | |
| 9,919,569 B2 | 3/2018 | Lewandowski et al. | |
| 10,035,384 B2 | 7/2018 | Keeney et al. | |
| 10,052,923 B2 | 8/2018 | Power et al. | |
| 10,391,824 B2 | 8/2019 | Trostle et al. | |
| 11,002,352 B2 | 5/2021 | Ghatti et al. | |
| 2013/0075183 A1* | 3/2013 | Kochidomari | B60K 17/043 477/3 |
| 2014/0041481 A1 | 2/2014 | Pinotti | |
| 2015/0096655 A1 | 4/2015 | Koulinitch et al. | |
| 2016/0280064 A1* | 9/2016 | Nozu | F16D 48/06 |
| 2017/0241486 A1* | 8/2017 | Pritchard | F16D 23/14 |
| 2018/0259048 A1 | 9/2018 | De Stefani et al. | |
| 2019/0039409 A1 | 2/2019 | Eschenburg et al. | |
| 2019/0054816 A1 | 2/2019 | Garcia et al. | |
| 2019/0331173 A1 | 10/2019 | Eschenburg et al. | |
| 2021/0387475 A1* | 12/2021 | Keeney | B60K 17/043 |

FOREIGN PATENT DOCUMENTS

| | | |
|---|---|---|
| CN | 109398078 A | 3/2019 |
| CN | 110822033 A | 2/2020 |
| CN | 112218766 A | 1/2021 |
| DE | 102017005462 A1 | 11/2017 |
| WO | 2019035042 A1 | 2/2019 |
| WO | 2019217861 A1 | 11/2019 |
| WO | 2019233329 A1 | 12/2019 |
| WO | 2021005186 A1 | 1/2021 |
| WO | 2021069818 A1 | 4/2021 |

OTHER PUBLICATIONS

Chinese First Office Action dated Sep. 6, 2023 for related Chinese Appln. No. 202110302203.6; 8 Pages.

Extended European Search Report dated Oct. 20, 2021 for related European Appln. No. 21173054.4, 7 Pages.

* cited by examiner

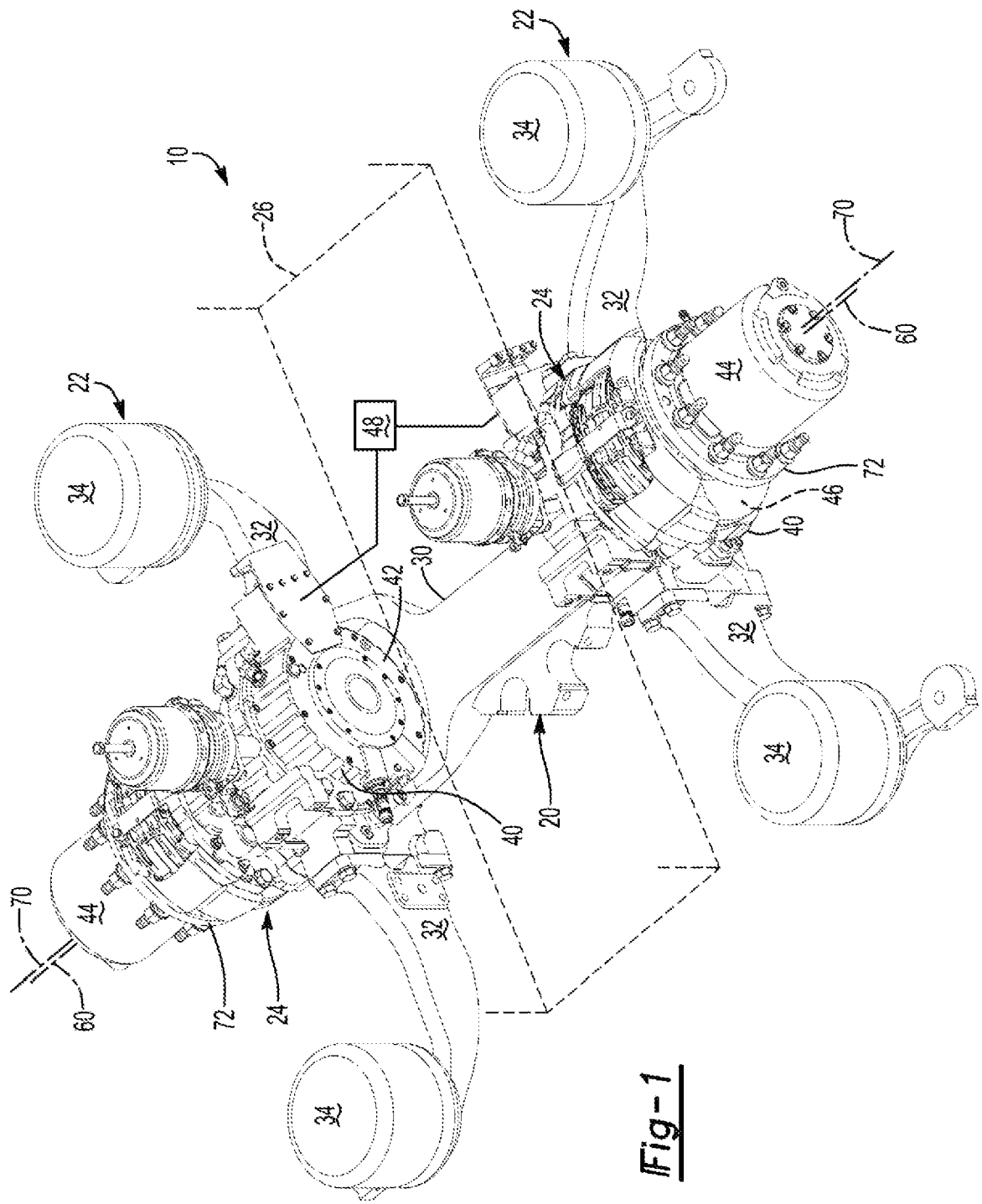

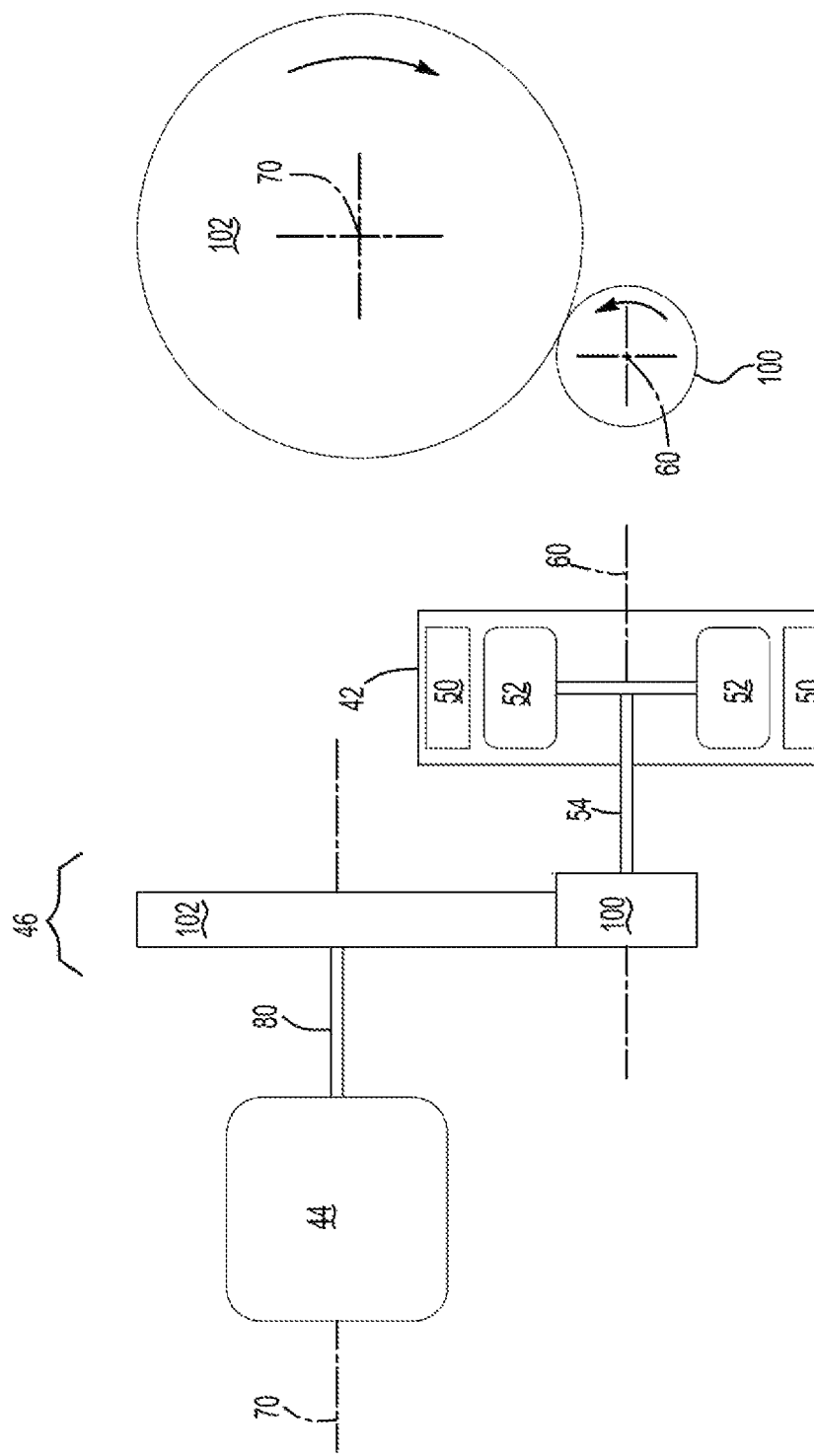

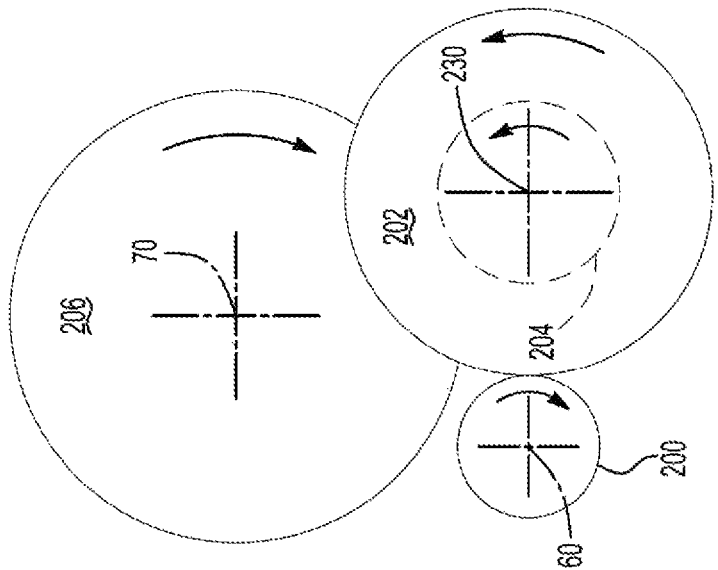
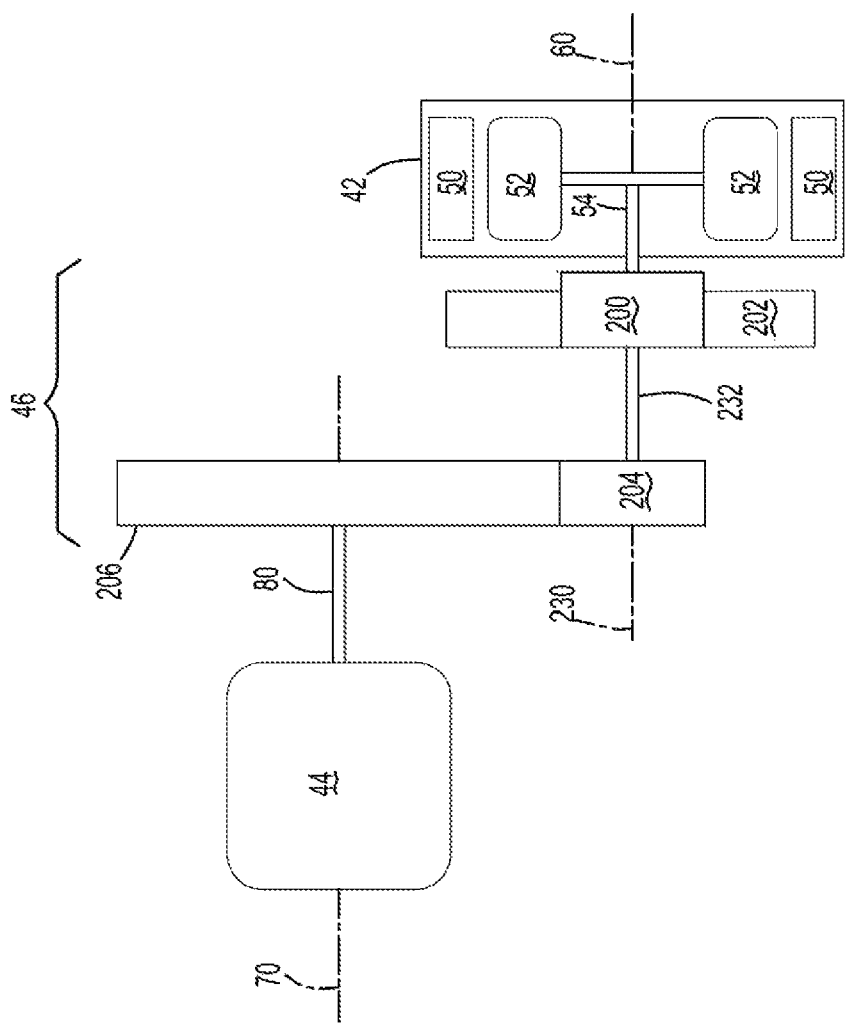

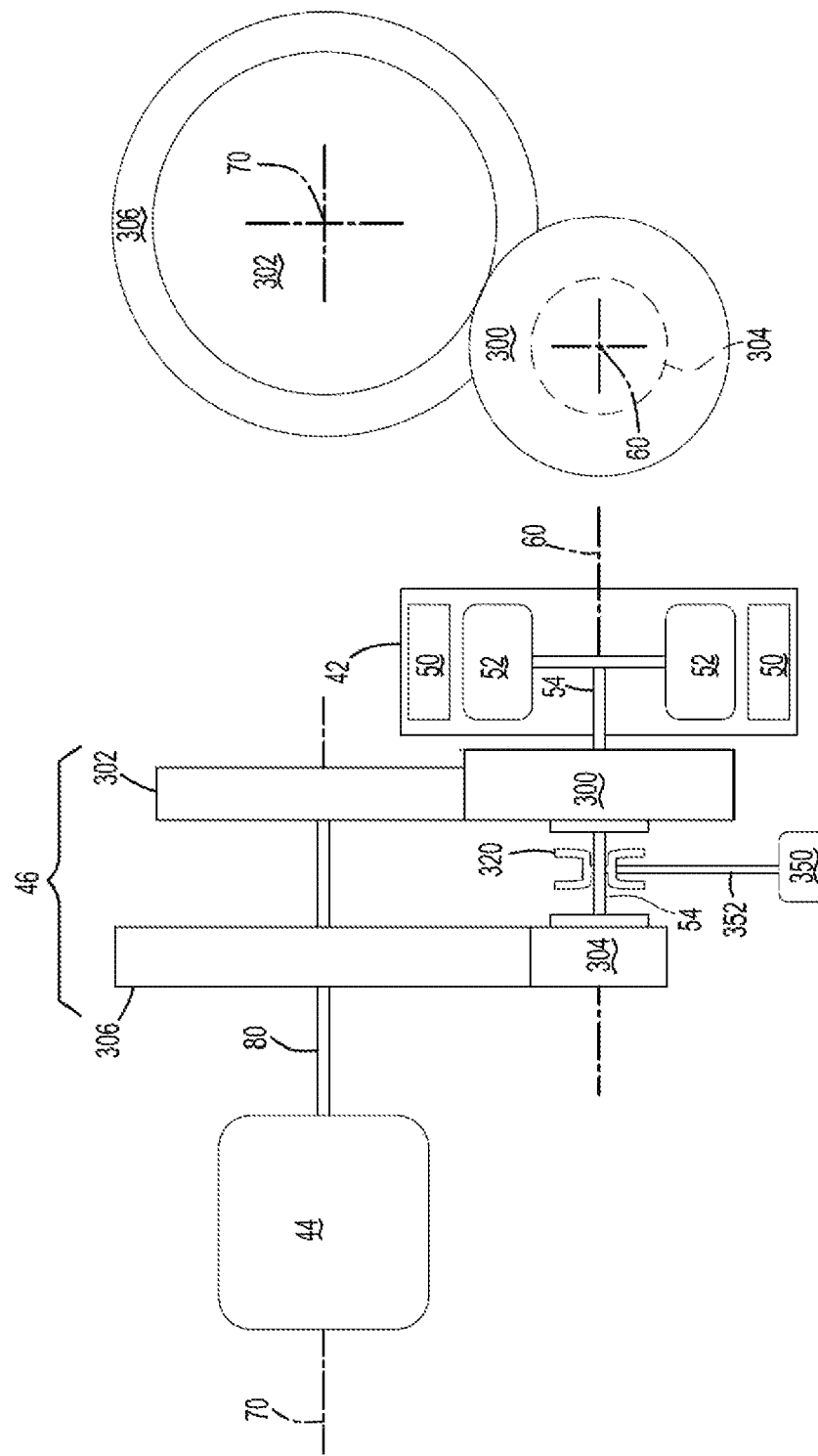

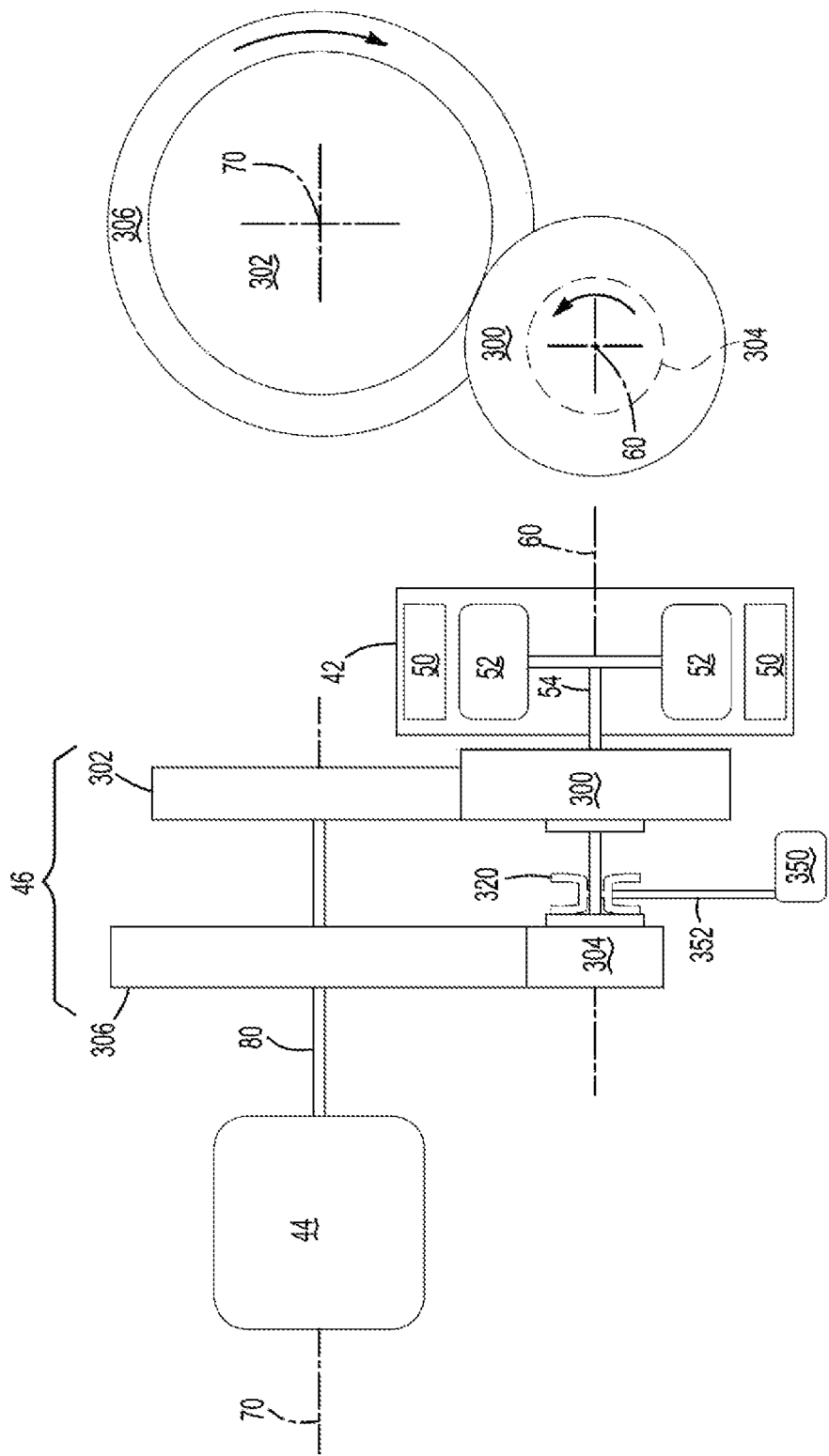

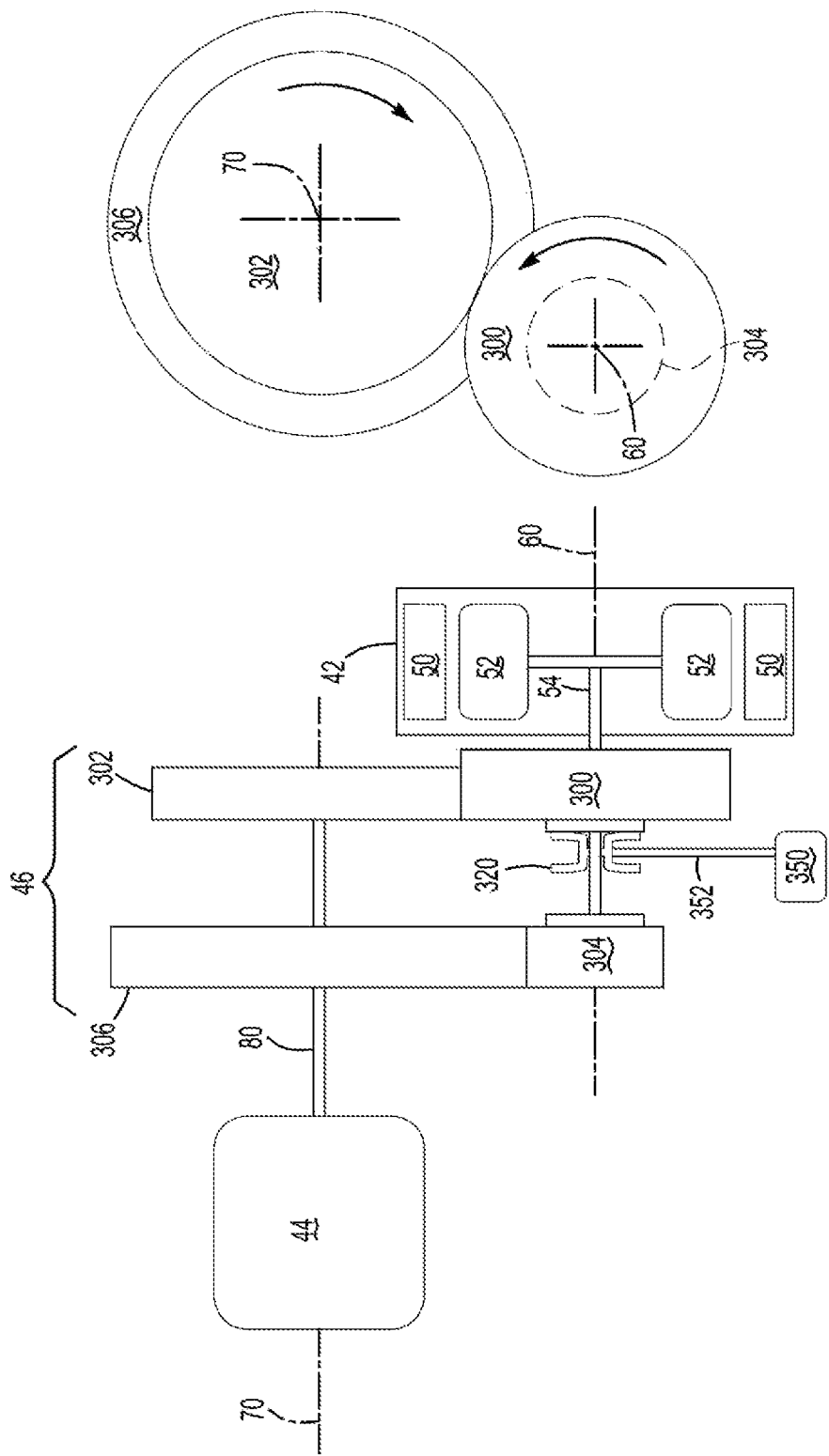

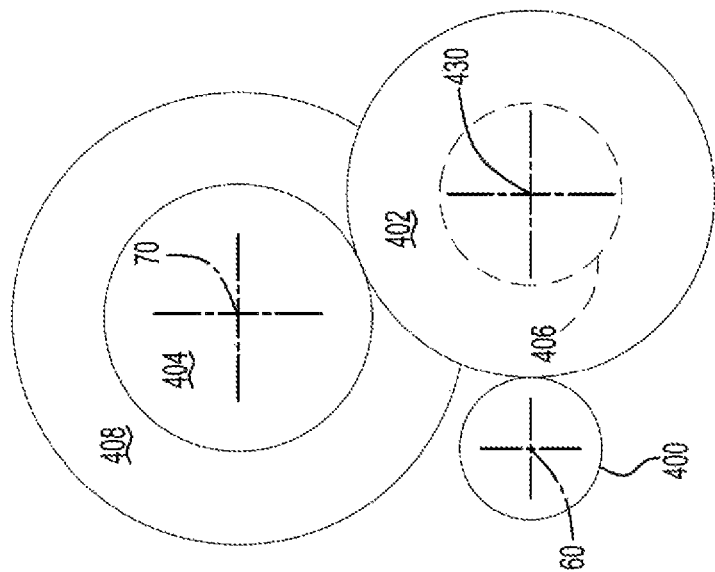
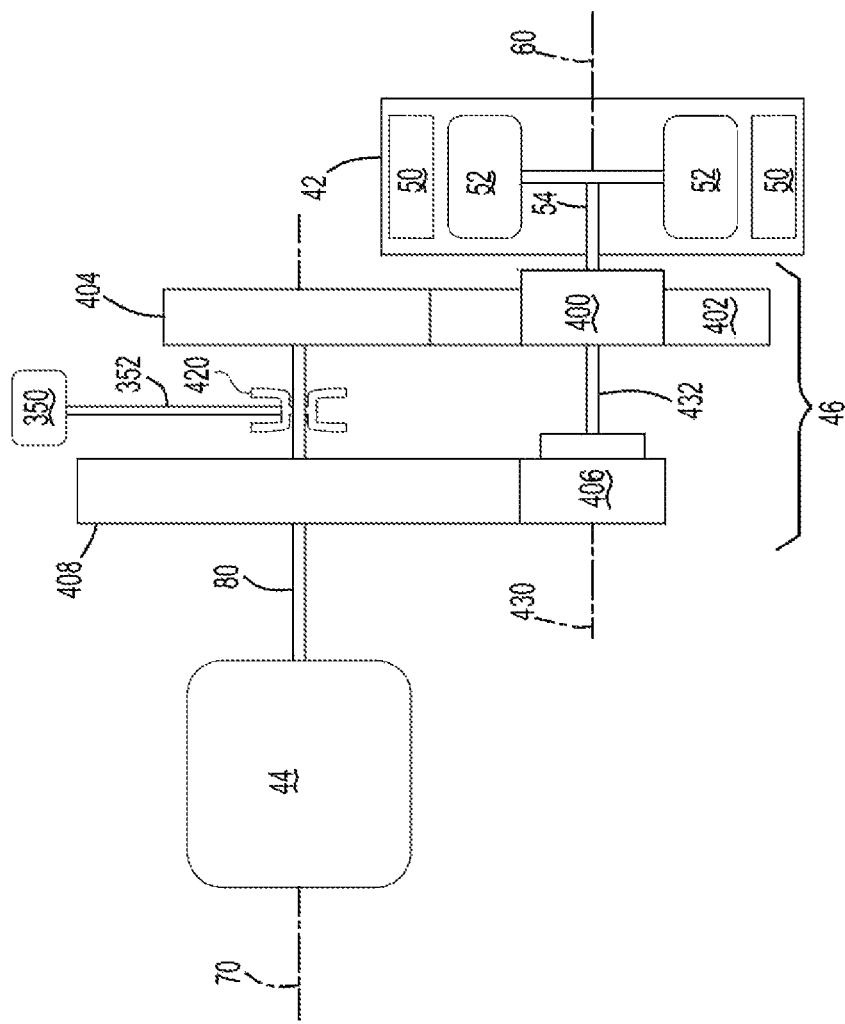

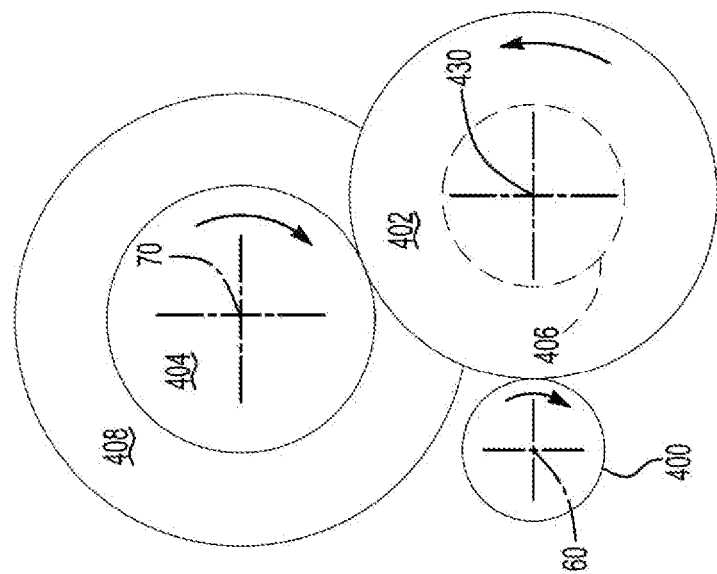
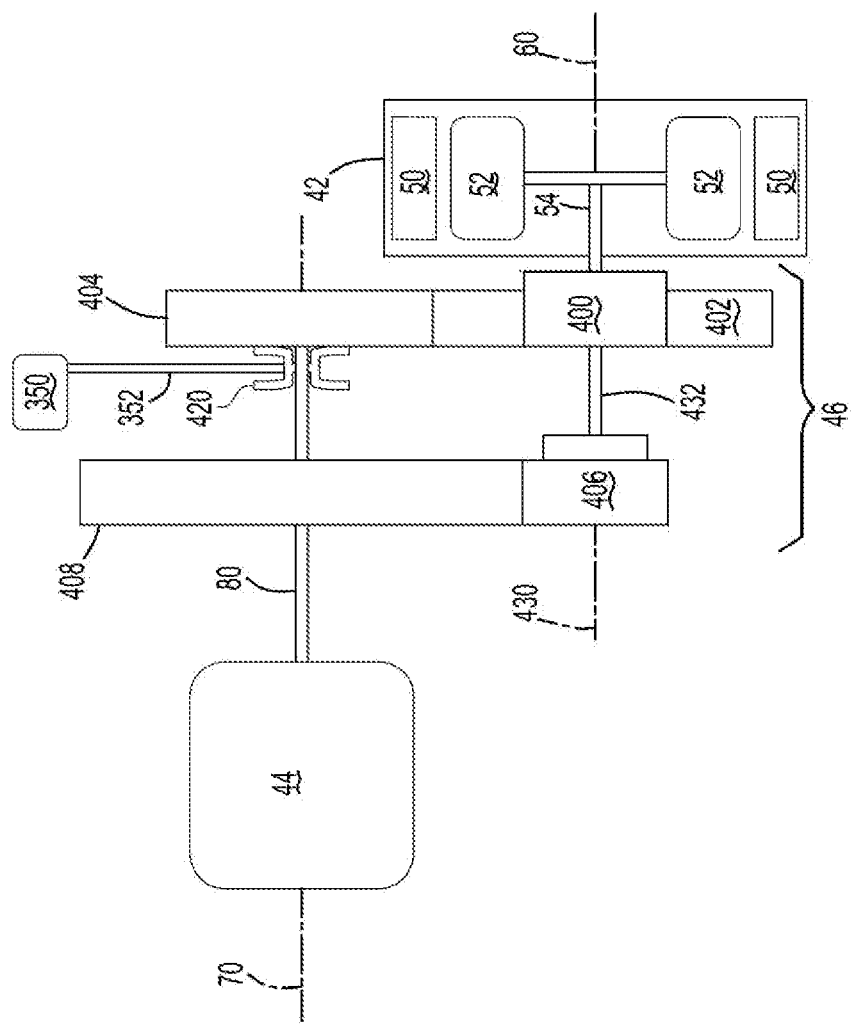
Fig-9B
Fig-9A

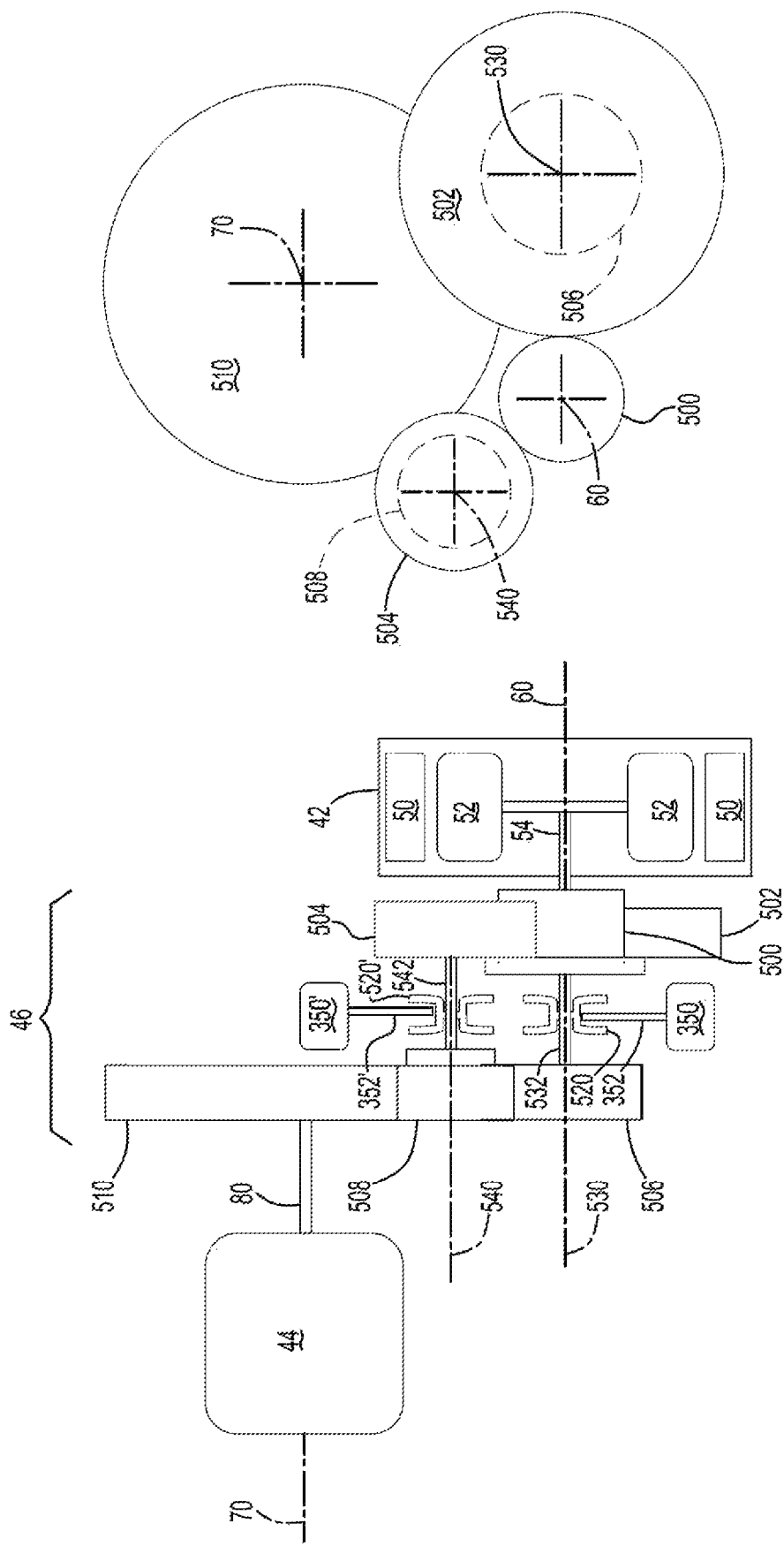

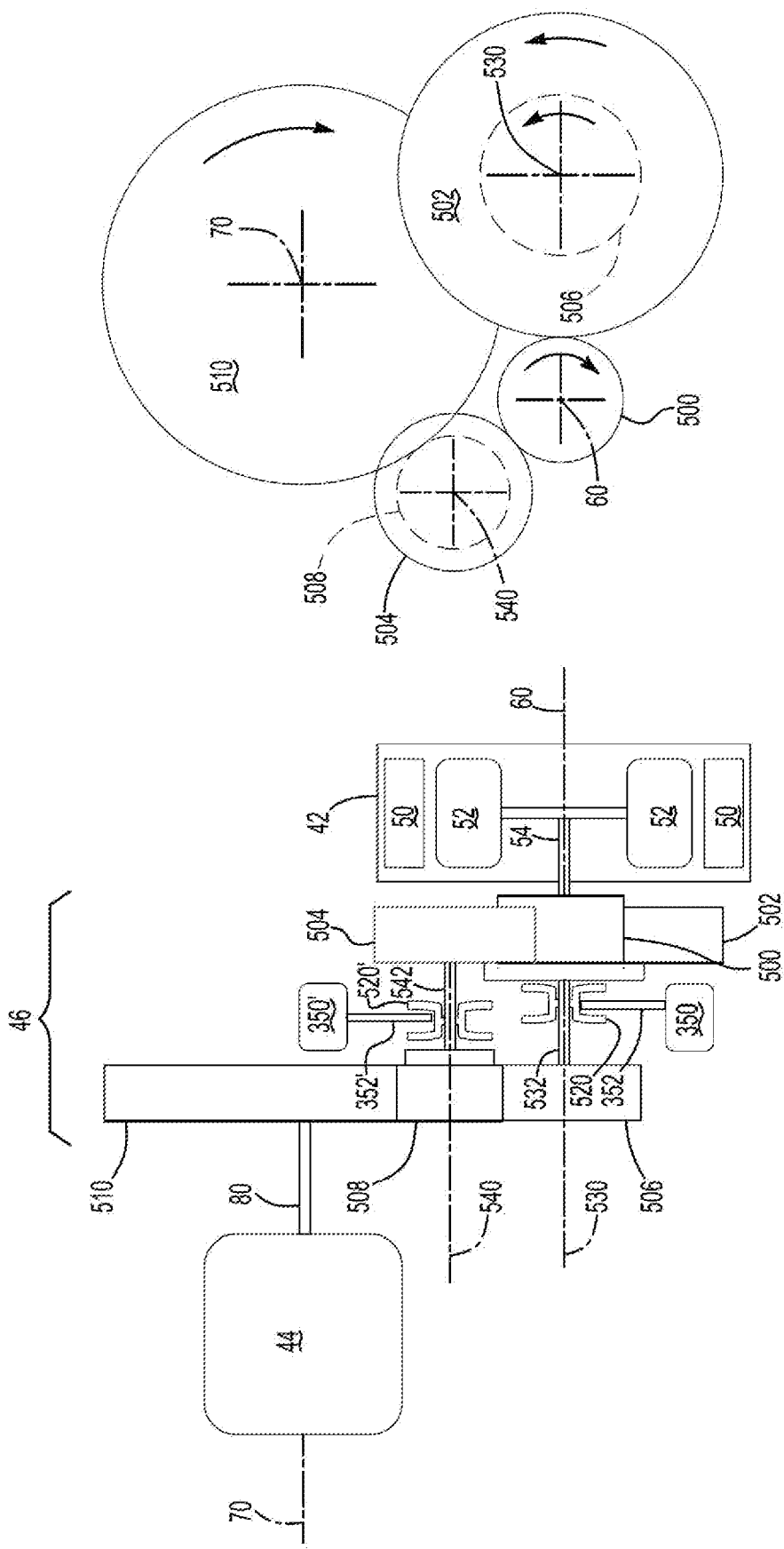

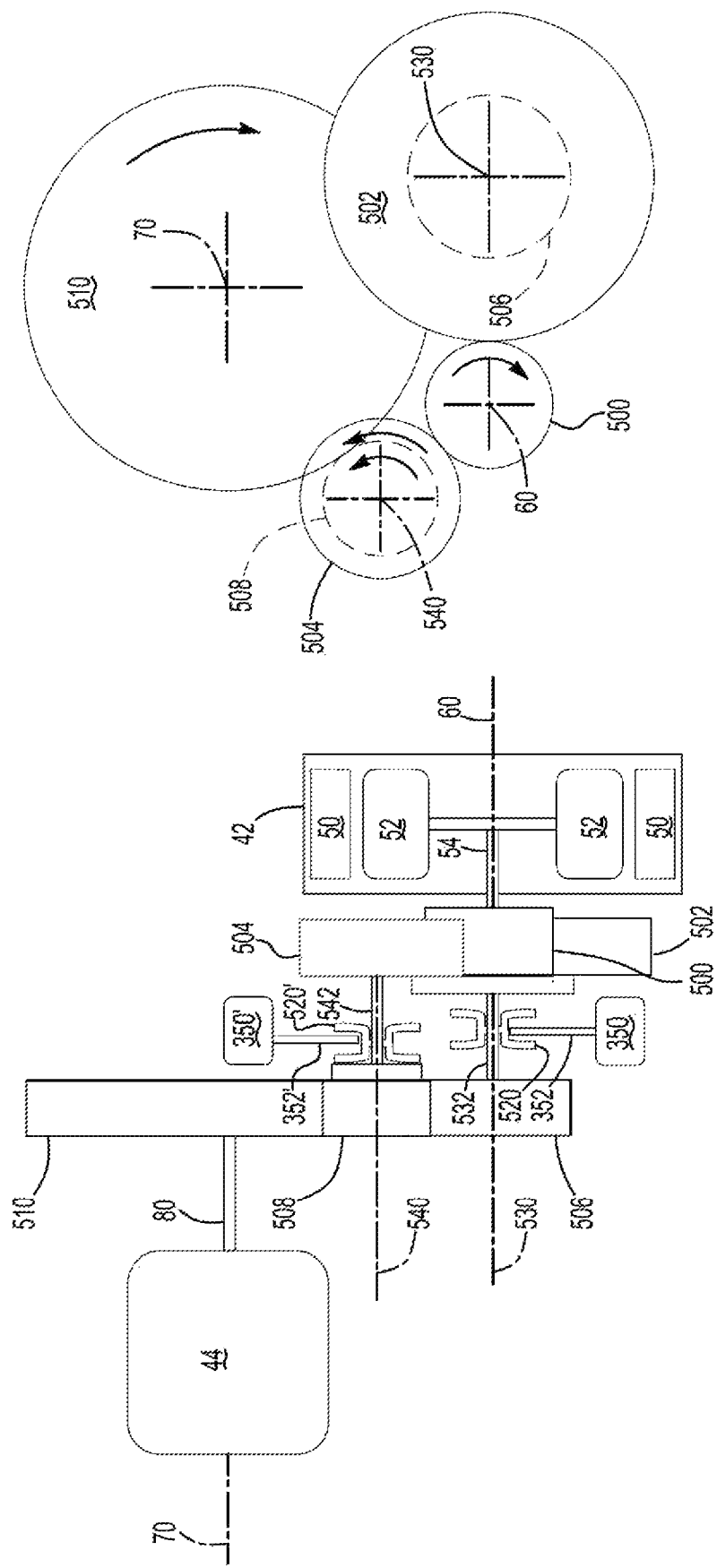

AXLE ASSEMBLY

CROSS-REFERENCE TO RELATED APPLICATIONS

This application is a division of U.S. application Ser. No. 16/901,704, filed Jun. 15, 2020, now U.S. Pat. No. 11,618,281, the disclosure of which is hereby incorporated in its entirety by reference herein.

TECHNICAL FIELD

This document relates to an axle assembly that may have a reduction gear module may transmit torque between the electric motor and the wheel end assembly.

BACKGROUND

An axle assembly having an electric motor module is disclosed in U.S. Patent Publication No. 2019/0054816.

SUMMARY

In at least one embodiment, an axle assembly is provided. The axle assembly may include an electric motor, a wheel end assembly, and a reduction gear module. The electric motor may have a rotor that may be rotatable about a first axis. The wheel end assembly may be rotatable about a second axis that may be disposed above the first axis. The wheel end assembly may include a wheel hub that may be adapted to facilitate mounting of a wheel. The reduction gear module may have a plurality of gears that may transmit torque between the electric motor and the wheel end assembly.

In at least one embodiment, an axle assembly is provided. The axle assembly may include an electric motor, a wheel end assembly, a reduction gear module, and a clutch. The electric motor may have a rotor and a rotor shaft that may be rotatable about a first axis. The wheel end assembly may be rotatable about a second axis that may be disposed above the first axis. The wheel end assembly may have a wheel hub that may be adapted to facilitate mounting of a wheel. The reduction gear module may include a first gear, a second gear, a third gear, and a fourth gear. The first gear may be rotatable about the first axis with the rotor. The second gear may mesh with the first gear and may be rotatable about the second axis. The third gear may be rotatable about the first axis. The fourth gear may mesh with the third gear and may be rotatable about the second axis. The clutch may selectively couple the first gear or the third gear to the rotor shaft.

In at least one embodiment, an axle assembly is provided. The axle assembly may include an electric motor, a wheel end assembly, a reduction gear module, and a clutch. The electric motor may have a rotor and a rotor shaft that may be rotatable about a first axis. The wheel end assembly may be rotatable about a second axis that may be disposed above the first axis. The wheel end assembly may have a wheel hub that may be adapted to facilitate mounting of a wheel. The reduction gear module may include a first gear, a second gear, a third gear, a fourth gear, and a fifth gear. The first gear may be rotatable about the first axis with the rotor. The second gear may mesh with the first gear and may be rotatable about a third axis. The third gear may mesh with the second gear and may be rotatable about the second axis. The fourth gear may be rotatable about the third axis. The fifth gear may mesh with the fourth gear and may be rotatable about the second axis. The clutch may selectively couple the third gear or the fifth gear to a wheel end shaft that may be rotatable about the second axis and may be connected to the wheel end assembly.

In at least one embodiment, an axle assembly is provided. The axle assembly may include an electric motor, a wheel end assembly, a reduction gear module, a clutch, and a second clutch. The electric motor may have a rotor and a rotor shaft that may be rotatable about a first axis. The wheel end assembly may be rotatable about a second axis that may be disposed above the first axis. The wheel end assembly may have a wheel hub that may be adapted to facilitate mounting of a wheel. The reduction gear module may include a first gear, a second gear, a third gear, a fourth gear, a fifth gear, and a sixth gear. The first gear may be rotatable about the first axis with the rotor. The second gear may mesh with the first gear, may be rotatable about a third axis, and may be selectively coupled to a first connection shaft. The third gear may mesh with the first gear, may be rotatable about the fourth axis, and may be selectively coupled to a second connection shaft. The fourth gear may be rotatable about the third axis and may be selectively coupled to the first connection shaft. The fifth gear may be rotatable about the fourth axis and may be selectively coupled to the second connection shaft. The sixth gear may mesh with the fourth gear and the fifth gear, may be rotatable about the second axis, and may be connected to the wheel end assembly. The clutch may selectively couple the second gear or the fourth gear to the rotor shaft. The second clutch may selectively couple the third gear or the fifth gear to the second connection shaft.

BRIEF DESCRIPTION OF THE DRAWINGS

FIG. 1 is a perspective view of an example of a drive axle system.

FIGS. 2A and 2B illustrate an example of an axle assembly that may be provided with the drive axle system.

FIGS. 3A and 3B illustrate an example of an axle assembly that may be provided with the drive axle system.

FIGS. 4A and 4B illustrate an example of an axle assembly that may be provided with the drive axle system with a clutch in a neutral position.

FIGS. 5A and 5B illustrate the axle assembly of FIGS. 4A and 4B with the clutch in a low speed position.

FIGS. 6A and 6B illustrate the axle assembly of FIGS. 4A and 4B with the clutch in a high speed position.

FIGS. 7A and 7B illustrate an example of an axle assembly that may be provided with the drive axle system with a clutch in a neutral position.

FIGS. 9A and 9B illustrate the axle assembly of FIGS. 7A and 7B with the clutch in a high speed position.

FIGS. 13A and 13B illustrate an example of an axle assembly that may be provided with the drive axle system with a clutch in a neutral position.

FIGS. 14A and 14B illustrate the axle assembly of FIGS. 13A and 13B with the clutch in a low speed position.

FIGS. 15A and 15B illustrate the axle assembly of FIGS. 13A and 13B with the clutch in a high speed position.

DETAILED DESCRIPTION

Figure 8B:
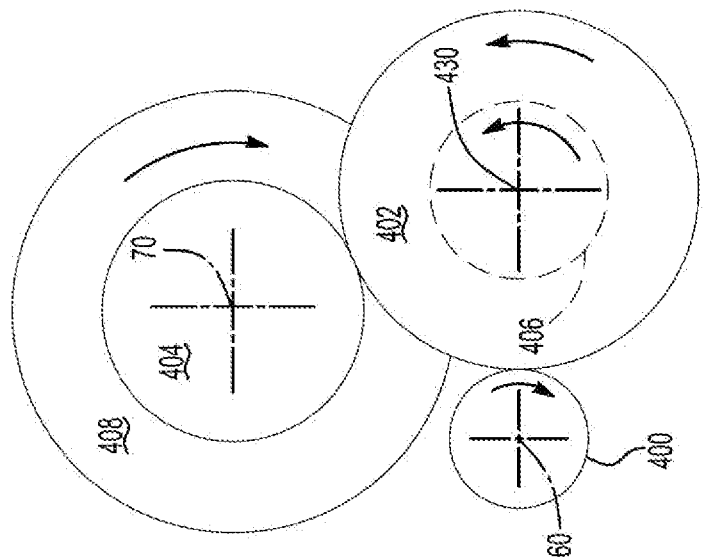
FIGS. 8A and 8B illustrate the axle assembly of FIGS. 7A and 7B with the clutch in a low speed position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an example of a drive axle system 10 is shown. The drive axle system 10 may be provided with a motor vehicle like a bus, car, truck, or the like. In at least one configuration, the drive axle system 10 may include a support structure 20, a suspension system 22, and one or more axle assemblies 24.

The support structure 20 may be configured to support a pair of axle assemblies 24. The support structure 20 may include a main support 30 that may extend in a lateral direction between the axle assemblies 24 and may primarily extend below the axle assemblies 24 and that may have a generally flat or planar top surface disposed between the axle assemblies 24 and below axes or rotation of the axle assemblies 24. Such a configuration may allow a floor or aisle 26 of the vehicle to be laterally positioned above the top surface of the main support 30 and between the axle assemblies 24, which in turn may position the floor or aisle 26 closer to the ground or road upon which the vehicle is disposed. In at least one configuration, the support structure 20 may also include arms 32 that may extend from the main support 30. An arm 32 may be disposed proximate an end of the main support 30 and may generally extend in a longitudinal direction (e.g. forward or backward direction). In the configuration shown, a pair of arms 32 are provided that may extend in opposite directions from the main support 30.

The suspension system 22 may connect the support structure 20 with a frame or chassis of the vehicle. In addition, the suspension system 22 may dampen vibrations associated with vehicle travel, provide a desired level of ride quality, help control vehicle ride height, or combinations thereof. The suspension system 22 may have any suitable configuration. For instance, the suspension system 22 may be an independent suspension system that may allow wheels to independently move up and down with respect to each other or without influence from another wheel. Alternatively, the suspension system 22 may not be an independent suspension system. The suspension system 22 may include one or more dampeners 34, such as air springs, shock absorbers, or combinations thereof. In the configuration shown, the dampeners 34 are depicted as air springs and a dampener is disposed on each arm 32 of the support structure 20. A top side of each air spring may be disposed underneath a chassis of the vehicle and may support the chassis.

One or more axle assemblies 24 may be mounted on the support structure 20. In the FIG. 1, axle assemblies 24 are located at opposite ends of the main support 30. An axle assembly 24 may provide torque to a traction wheel assembly that may include a tire mounted on a wheel. In at least one configuration, an axle assembly 24 may include a housing assembly 40, and electric motor 42, a wheel end assembly 44, and a reduction gear module 46. The axle assembly 24 may also include a control system 48.

The housing assembly 40 may facilitate mounting of the axle assembly 24 to the support structure 20. In addition, the housing assembly 40 may receive various components of the axle assembly 24. For example, the housing assembly 40 may receive and support the electric motor 42 and the reduction gear module 46. In addition, the housing assembly 40 may help support the wheel end assembly 44. The housing assembly 40 is not shown in FIGS. 2A through 15B so that internal components of the axle assembly, such as gears of the reduction gear module 46, may be more clearly illustrated.

Referring to FIGS. 1 and 2A, the electric motor 42 may provide torque to the wheel end assembly 44 to help propel the vehicle. In addition, the electric motor 42 may receive torque from the wheel end assembly 44 to help recover energy or provide regenerative braking. The electric motor 42 may be electrically connected to an electrical power source, such as a battery, capacitor, or the like. An inverter may electrically connect the electric motor 42 and the electrical power source in a manner known by those skilled in the art. The electric motor 42 may have any suitable configuration. In at least one configuration, the electric motor 42 may include a stator 50 and a rotor 52.

Referring to FIG. 2A, the stator 50 may be fixedly positioned with respect to the housing assembly 40. For example, the stator 50 may extend around a first axis 60 and may not rotate about the first axis 60. The stator 50 may include windings that may be electrically connected to the electrical power source.

The rotor 52 may extend around the first axis 60 and may be received inside the stator 50. The rotor 52 may be rotatable about the first axis 60 with respect to the stator 50. For example, the rotor 52 may be spaced apart from the stator 50 and may include magnets or ferromagnetic material that may facilitate the generation of electrical current. The rotor 52 may extend around and may be fixedly mounted to a rotor shaft 54. As such, the rotor 52 and the rotor shaft 54 may be rotatable together about the first axis 60 and may be configured to not rotate with respect to each other. The rotor shaft 54 may extend along the first axis 60 or around the first axis 60 and may have a one piece construction or a multi-piece construction. The rotor 52 may be operatively connected to the wheel end assembly 44 via the reduction gear module 46 as will be discussed in more detail below.

Referring to FIGS. 1 and 2A, the wheel end assembly 44 may be disposed at an end of the axle assembly 24. For example, the wheel end assembly 44 may be disposed opposite the electric motor 42. The wheel end assembly 44 or a portion thereof may be rotatable about a second axis 70. For instance, the wheel end assembly 44 may have a wheel hub 72 that may be rotatable about the second axis 70. In at least one configuration, the second axis 70 may be disposed substantially parallel to the first axis 60 and may be disposed above the first axis 60 or further from the ground than the first axis 60. As an example, the second axis 70 may be disposed directly above the first axis 60, however, it is contemplated that the second axis 70 may be disposed above but not directly above the first axis 60 and the axle assembly 24 may be rotated or otherwise configured such that the first axis 60 is not disposed above the second axis 70.

The wheel hub 72 may support and facilitate mounting of a wheel. For instance, the wheel hub 72 may include a plurality of lug bolts that may extend through a corresponding holes of a vehicle wheel in a manner known by those skilled in the art. Optionally, reduction gearing may be provided with the wheel end assembly 44. For instance, a reduction gearset having bevel gears or a planetary gear set may be provided in the wheel end assembly 44 to provide gear reduction between the reduction gearset and the wheel hub 72. The wheel end assembly 44 may include a wheel end shaft 80 that may be operatively connected to the wheel hub 72 and the reduction gear module 46. For instance, torque may be transmitted from the reduction gear module 46 to the wheel end assembly 44 via the wheel end shaft 80.

The reduction gear module 46 may include a plurality of gears that may transmit torque between the electric motor 42 and the wheel end assembly 44. Various reduction gear module configurations are described below and are shown in FIGS. 2A through 15B. Figures ending with the letter "A" are schematic representations of the axle assembly and its corresponding reduction gear module. In these figures, the width of one or more gears may be exaggerated to more clearly depict a particular gear. Figures ending with the letter "B" are side views of the correspondingly numbered "A" figure with the electric motor 42 and the wheel end assembly 44 omitted for clarity. In some of the figures ending with the letter B, curved arrows are provided on some of the gears to illustrate examples of directions of rotation along a torque transmission path; however, the arrow direction is for illustration purposes and may be reversed depending on the location of the axle assembly (e.g., left vehicle side vs. right vehicle side), the direction of torque transmission (e.g., from the electric motor 42 to the wheel end assembly 44 versus from the wheel end assembly 44 to the electric motor 42), or both. Also, in the figures ending with the letter B, gears that are hidden behind another gear are depicted with dashed lines.

Each of the gears in FIGS. 2A through 15B may have a set of teeth that may be arranged around an associated axis of rotation of the gear and that may have teeth that face away from and extend away from the associated axis of rotation. Individual teeth are not illustrated for clarity, but would be disposed proximate the gear circles in the figures ending with the letter B. The teeth of the gears may have any suitable configuration. As some examples, the teeth may have spiral, straight, or helical configurations.

Referring to FIGS. 2A and 2B, an example of a reduction gear module 46 is shown that provides a single reduction between the electric motor 42 and the wheel end assembly 44. In the configuration shown, the reduction gear module 46 may include a first gear 100 and a second gear 102.

The first gear 100 may be rotatable about the first axis 60 with the rotor 52 and the rotor shaft 54. For instance, the first gear 100 may be fixedly disposed on the rotor shaft 54 such that the first gear 100 does not rotate about the first axis 60 with respect to the rotor shaft 54. The teeth of the first gear 100 may contact and may mate or mesh with teeth of the second gear 102.

The second gear 102 may be connected to the wheel end assembly 44. The second gear 102 may be rotatable about the second axis 70 with the wheel end shaft 80. For instance, the second gear 102 may be fixedly disposed on the wheel end shaft 80 such that the second gear 102 does not rotate about the second axis 70 with respect to the wheel end shaft 80. The second gear 102 may have a larger diameter than the first gear 100. As such, the first gear 100 and the second gear 102 may cooperate to reduce the input speed provided by the rotor 52 to a slower output speed at the wheel end shaft 80. As a nonlimiting example, the first gear 100 and second gear 102 may provide a gear ratio range of 9:1 to 13:1.

Referring to FIGS. 3A and 3B, another example of a reduction gear module 46 is shown that provides a double reduction between the electric motor 42 and the wheel end assembly 44. In the configuration shown, the reduction gear module 46 may include a first gear 200, a second gear 202, a third gear 204, and a fourth gear 206.

The first gear 200 may be rotatable about the first axis 60 with the rotor 52 and the rotor shaft 54. For instance, the first gear 200 may be fixedly disposed on the rotor shaft 54 such that the first gear 200 does not rotate about the first axis 60 with respect to the rotor shaft 54. The teeth of the first gear 200 may contact and may mate or mesh with teeth of the second gear 202.

The second gear 202 may be rotatable about a third axis 230. For instance, the second gear 202 may be mounted to a connection shaft 232 that may extend along and may be rotatable about the third axis 230. The second gear 202 may be fixedly disposed on the connection shaft 232 such that the second gear 202 does not rotate about the third axis 230 with respect to the connection shaft 232. The third axis 230 may be disposed below the second axis 70. In addition, the third axis 230 may be disposed above the first axis 60, below the first axis 60, or may be coplanar with the first axis 60 such that the first axis 60 and the third axis 230 may be disposed at a common distance or common height below the second axis 70. The second gear 202 may have a larger diameter than the first gear 200 and the third gear 204. As such, the first gear 200 and the second gear 202 may cooperate to reduce the input speed provided by the rotor 52 to a slower output speed at the third axis 230.

The third gear 204 may be rotatable about the third axis 230. For instance, the third gear 204 may be fixedly mounted to the connection shaft 232 or may be fixedly mounted to the second gear 202 such that the connection shaft 232 may be omitted. As such, the third gear 204 may not rotate about the third axis 230 with respect to the second gear 202 and the connection shaft 232, if provided. In at least one configuration, the third gear 204 may be axially positioned along the third axis 230 further from the electric motor 42 than the second gear 202. The teeth of the third gear 204 may contact and may mate or mesh with teeth of the fourth gear 206.

The fourth gear 206 may be connected to the wheel end assembly 44. The fourth gear 206 may be rotatable about the second axis 70 with the wheel end shaft 80. For instance, the fourth gear 206 may be fixedly disposed on the wheel end shaft 80 such that the fourth gear 206 does not rotate about the second axis 70 with respect to the wheel end shaft 80. The fourth gear 206 may have a larger diameter than the third gear 204. As such, the third gear 204 and the fourth gear 206 may cooperate to reduce the input speed provided by the second gear 202 to a slower output speed at the second axis 70. As a nonlimiting example, the first gear 200 and second gear 202 may provide a gear ratio range of 9:1 to 13:1 while the third gear 204 and fourth gear 206 may provide a gear ratio range of 18:1 to 26:1.

Referring to FIGS. 4A through 6B, another example of a reduction gear module 46 having a multi-speed configuration is shown that has single reduction gearsets between the electric motor 42 and the wheel end assembly 44. In the configuration shown, the reduction gear module 46 may include a first gear 300, a second gear 302, a third gear 304, and a fourth gear 306. The control system 48 may include a clutch 320.

The first gear 300 may be rotatably disposed on the rotor shaft 54. For instance, the first gear 300 may have a through hole through which the rotor shaft 54 may extend. The through hole may receive a bushing or a bearing that may extend around the rotor shaft 54 and that may rotatably support the first gear 300. The first gear 300 may be selectively coupled to the rotor shaft 54 with the clutch 320 as will be discussed in more detail below. The teeth of the first gear 300 may contact and may mate or mesh with teeth of the second gear 302.

The second gear 302 may be connected to the wheel end assembly 44. The second gear 302 may be rotatable about the second axis 70 with the wheel end shaft 80. For instance, the second gear 302 may be fixedly disposed on the wheel end shaft 80 such that the second gear 302 does not rotate about the second axis 70 with respect to the wheel end shaft 80. The second gear 302 may have a larger diameter than the first gear 300, the third gear 304, or both. As such, the first gear 300 and the second gear 302 may cooperate to reduce the input speed provided by the rotor 52 to a slower output speed at the wheel end shaft 80.

The third gear 304 may be rotatably disposed on the rotor shaft 54. For instance, the third gear 304 may have a hole that may receive the rotor shaft 54. A bushing or bearing that may rotatably support the third gear 304 may be received in the hole and may extend around the rotor shaft 54. The third gear 304 may be selectively coupled to the rotor shaft 54 with the clutch 320 as will be discussed in more detail below. In at least one configuration, the third gear 204 may be axially positioned along the first axis 60 further from the electric motor 42 than the first gear 300. The teeth of the third gear 304 may contact and may mate or mesh with teeth of the fourth gear 306.

The fourth gear 306 may be connected to the wheel end assembly 44. The fourth gear 306 may be rotatable about the second axis 70 with the wheel end shaft 80. For instance, the fourth gear 306 may be fixedly disposed on the wheel end shaft 80 such that the fourth gear 306 does not rotate about the second axis 70 with respect to the wheel end shaft 80. The fourth gear 306 may be axially positioned along the second axis 70 such that the fourth gear 306 may be positioned between the wheel end assembly 44 and the second gear 302. The fourth gear 306 may have a larger diameter than the second gear 302, the third gear 304, or both. As such, the fourth gear 306 and the third gear 304 may cooperate to reduce the input speed provided by the rotor 52 to a slower output speed at the wheel end shaft 80 and may reduce the input speed by a different magnitude than the first gear 300 and the second gear 302.

The clutch 320 may selectively couple the first gear 300 or the third gear 304 to the rotor shaft 54. A clutch may have any suitable configuration. For example, a clutch may be configured as a disc clutch that may include friction discs that may be engaged to couple a gear to a corresponding shaft. As another example, a clutch may be configured as a dog clutch or clutch collar that may receive, rotate with, and slide along a corresponding shaft to selectively couple and decouple one or more gears from the shaft. A clutch that is configured as a dog clutch or clutch collar may have a through hole that may receive a shaft and may be rotatably coupled to the shaft such that the clutch is rotatable with the shaft. For instance, a clutch and shaft may have mating splines that may inhibit rotation of the clutch with respect to the shaft while allowing the clutch to slide in an axial direction with respect to the shaft to engage or disengage a gear. Such a clutch may have a tooth or teeth that may be configured to selectively mate or mesh with corresponding teeth on a gear to couple the gear to the shaft such that the gear is rotatable about an axis with the shaft. The tooth or teeth of the clutch may be configured as a face gear that may be disposed along a lateral side of the clutch or may be configured like a spline and may be received inside a hole of a gear. Clutches will primarily be described below as having a dog clutch or clutch collar configuration; however it is to be understood that a clutch may have a different configuration and may not be configured as a dog clutch or a clutch collar, that a different number clutches may be provided, and that clutches may be associated with a single gear rather than multiple gears or vice versa. For instance, one clutch may selectively couple the first gear 300 to the rotor shaft 54 while another clutch may selectively couple the third gear 304 to the rotor shaft 54.

The clutch 320 may be operatively connected to an actuator 350 that may be configured to move the clutch along the first axis 60. A linkage 352, such as a shift fork, may operatively connect the clutch 320 to the actuator 350. The actuator 350 may be of any suitable type. For instance, the actuator 350 may be an electrical, electromechanical, pneumatic, or hydraulic actuator. In at least one configuration, such as when the clutch 320 is a clutch collar or dog clutch, the actuator 350 may move the clutch 320 along the first axis 60 and may execute a shift when the rotational speed of the clutch 320 and a gear are sufficiently synchronized to complete a shift so that the teeth of the clutch 320 may mesh with teeth of a gear, such as the first gear 300 or the third gear 304, or so that the teeth of the clutch 320 may disengage from teeth on the first gear 300 or the third gear 304. In at least one configuration, the clutch 320 may be axially positioned along the first axis 60 between the first gear 300 and the third gear 304. Such axial positioning may help reduce the axial length of the axle assembly and may help provide a more compact arrangement.

Referring to FIGS. 4A and 4B, the clutch 320 is shown in a neutral position. The clutch 320 may not couple the first gear 300 or the third gear 304 to the rotor shaft 54 when the clutch 320 is in the neutral position. As such, the first gear 300 and the third gear 304 may be decoupled from the rotor shaft 54 such that the rotor shaft 54 may be rotatable with respect to the first gear 300 and the third gear 304. Thus, torque may not be transmitted between the electric motor 42 and the wheel end assembly 44 when the clutch 320 is in the neutral position.

Referring to FIGS. 5A and 5B, the clutch 320 is shown in a low speed position. The clutch 320 may be moved to the low speed position by the actuator 350. In the low speed position, the clutch 320 may couple the third gear 304 to the rotor shaft 54 such that the third gear 304 is rotatable about the first axis 60 with the rotor shaft 54. Thus, the rotor 52, the rotor shaft 54, and the third gear 304 are rotatable together about the first axis 60 and torque may be transmitted between the electric motor 42 and the wheel end shaft 80 of the wheel end assembly 44 via the third gear 304 and the fourth gear 306. The clutch 320 does not couple the first gear 300 to the rotor shaft 54 in the low speed position. As such, the first gear 300 may be decoupled from the rotor shaft 54 such that the rotor shaft 54 is rotatable with respect to the first gear 300. Thus, torque is not transmitted between the electric motor 42 and the wheel end shaft 80 of the wheel end assembly 44 via the first gear 300 and the second gear 302.

Referring to FIGS. 6A and 6B, the clutch 320 is shown in a high speed position. The clutch 320 may be moved to the high speed position by the actuator 350. In the high speed position, the clutch 320 may couple the first gear 300 to the rotor shaft 54 such that the first gear 300 is rotatable about the first axis 60 with the rotor shaft 54. Thus, the rotor 52, the rotor shaft 54, and the first gear 300 are rotatable together about the first axis 60 and torque may be transmitted between the electric motor 42 and the wheel end shaft 80 of the wheel end assembly 44 via the first gear 300 and the second gear 302. The clutch 320 does not couple the third gear 304 to the rotor shaft 54 in the high speed position. As such, the third gear 304 may be decoupled from the rotor shaft 54 such that the rotor shaft 54 is rotatable with respect to the third gear 304. Thus, torque is not transmitted between the electric motor 42 and the wheel end shaft 80 of the wheel end assembly 44 via the third gear 304 and the fourth gear 306.

Referring to FIGS. 7A through 9B, another example of a reduction gear module 46 having a multi-speed configuration is shown. This configuration includes multiple reductions between the electric motor 42 and the wheel end assembly 44. In the configuration shown, the reduction gear module may include a first gear 400, a second gear 402, a third gear 404, a fourth gear 406, and a fifth gear 408. The control system 48 may include a clutch 420.

The first gear 400 may be rotatable about the first axis 60 with the rotor 52 and the rotor shaft 54. For instance, the first gear 400 may be fixedly disposed on the rotor shaft 54 such that the first gear 400 does not rotate about the first axis 60 with respect to the rotor shaft 54. The teeth of the first gear 400 may contact and may mate or mesh with teeth of the second gear 402.

The second gear 402 may be rotatable about a third axis 430. For instance, the second gear 402 may be mounted to a connection shaft 432 that may extend along and may be rotatable about the third axis 430. The second gear 402 may be fixedly disposed on the connection shaft 432 such that the second gear 402 does not rotate about the third axis 430 with respect to the connection shaft 432. The third axis 430 may be disposed below the second axis 70. In addition, the third axis 430 may be disposed above the first axis 60, below the first axis 60, or may be coplanar with the first axis 60 such that the first axis 60 and the third axis 430 may be disposed at a common distance or common height below the second axis 70. The second gear 402 may have a larger diameter than the first gear 400 and the third gear 404. Teeth of the second gear 402 may contact and may mate or mesh with teeth of the third gear 404.

The third gear 404 may be rotatable about the second axis 70. In at least one configuration, the third gear 404 may be rotatably disposed on the wheel end shaft 80. For instance, the third gear 404 may have a hole that may receive the wheel end shaft 80. The hole may also receive a bushing or bearing that may extend around the wheel end shaft 80 and that may rotatably support the third gear 404. The third gear 404 may be selectively coupled to the wheel end shaft 80 with the clutch 420 as will be discussed in more detail below.

The fourth gear 406 may be rotatable about a third axis 430. For instance, the fourth gear 406 may be mounted to the connection shaft 432. The fourth gear 406 may be fixedly disposed on the connection shaft 432 such that the fourth gear 406 does not rotate about the third axis 430 with respect to the connection shaft 432. Alternatively, the fourth gear 406 may be fixedly mounted to the second gear 402 such that the connection shaft 432 may be omitted. The fourth gear 406 may be axially positioned along the third axis 430 further from the electric motor 42 than the second gear 402. Teeth of the fourth gear 406 may contact and may mate or mesh with teeth of the fifth gear 408.

The fifth gear 408 may be rotatable about the second axis 70. In at least one configuration, the fifth gear 408 may be rotatably disposed on the wheel end shaft 80. For instance, the fifth gear 408 may have a hole through which the wheel end shaft 80 may extend. The hole may also receive a bushing or bearing that may extend around the wheel end shaft 80 and that may rotatably support the fifth gear 408. The fifth gear 408 may be selectively coupled to the wheel end shaft 80 with the clutch 420.

The clutch 420 may selectively couple the third gear 404 or the fifth gear 408 to the wheel end shaft 80. The clutch 420 may have any suitable configuration as was previously described with respect to clutch 320. However, the location of the clutch 420 may differ from that shown in FIGS. 4A through 6B in that the clutch 420 may be configured to move along the second axis 70. The clutch 420 may be operatively connected to the actuator 350, such as with a linkage 352 as previously described. In at least one configuration, the actuator 350 may move the clutch 420 along the second axis 70 to execute a shift when the rotational speed of the clutch 420 and a gear are sufficiently synchronized to complete a shift or two facilitate disengagement from a gear as previously discussed. In at least one configuration, the clutch 420 may be axially positioned along the second axis 70 between the third gear 404 and the fifth gear 408; however, it is contemplated that separate clutches may be associated with the third gear 404 and the fifth gear 408 and one or more of these clutches may not be axially positioned between the third gear 404 and the fifth gear 408.

Referring to FIGS. 7A and 7B, the clutch 420 is shown in a neutral position. The clutch 420 may not couple the third gear 404 or the fifth gear 408 to the wheel end shaft 80 when the clutch 420 is in the neutral position. As such, the third gear 404 and the fifth gear 408 may be decoupled from the wheel end shaft 80 such that the wheel end shaft 80 may be rotatable with respect to the third gear 404 and the fifth gear 408. Thus, torque may not be transmitted between the electric motor 42 and the wheel end assembly 44 when the clutch 420 is in the neutral position.

Figure 8A:
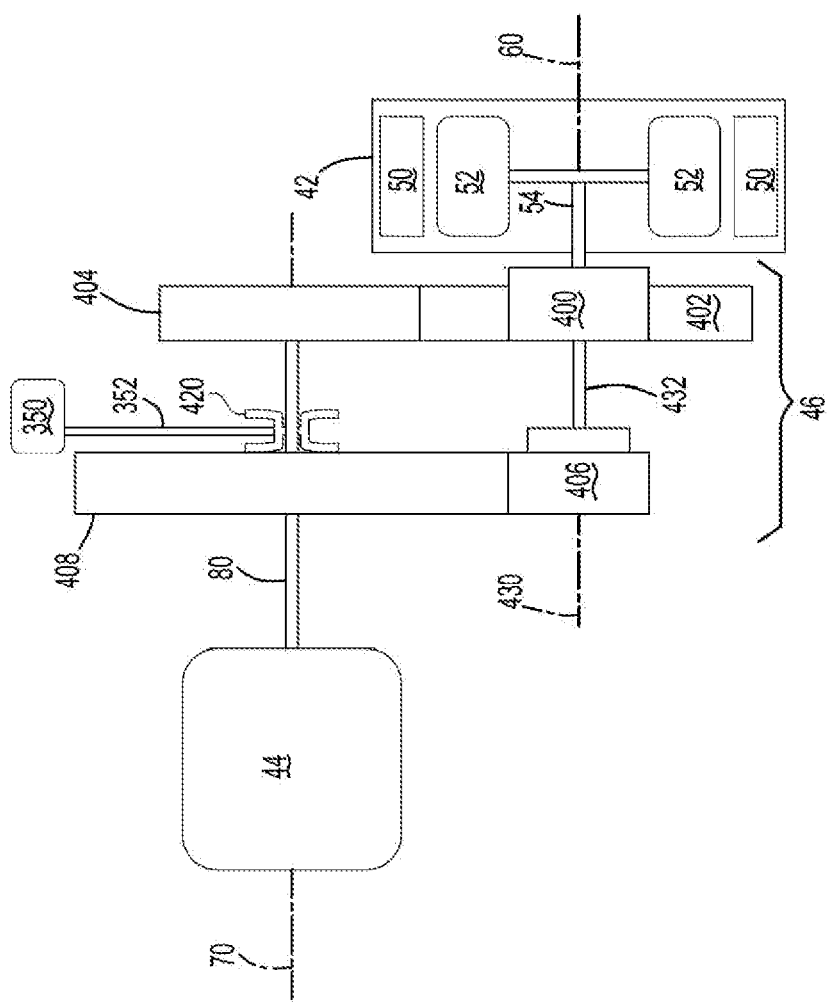

Referring to FIGS. 8A and 8B, the clutch 420 is shown in a low speed position. The clutch 420 may be moved to the low speed position by the actuator 350. In the low speed position, the clutch 420 may couple the fifth gear 408 to the wheel end shaft 80 such that the fifth gear 408 is rotatable about the second axis 70 with the wheel end shaft 80. Thus, torque may be transmitted between the electric motor 42 and the wheel end shaft 80 of the wheel end assembly 44 via the first gear 400, the second gear 402, the fourth gear 406, and the fifth gear 408. The clutch 420 does not couple the third gear 404 to the wheel end shaft 80 in the low speed position. As such, the third gear 404 may be decoupled from the wheel end shaft 80 such that the wheel end shaft 80 is rotatable with respect to the third gear 404. Although the second gear 402 may rotate the third gear 404, torque is not transmitted between the electric motor 42 and the wheel end shaft 80 of the wheel end assembly 44 via the second gear 402 and the third gear 404.

Referring to FIGS. 9A and 9B, the clutch 420 is shown in a high speed position. The clutch 420 may be moved to the high speed position by the actuator 350. In the high speed position, the clutch 420 may couple the third gear 404 to the wheel end shaft 80 such that the third gear 404 is rotatable about the second axis 70 with the wheel end shaft 80. Thus, torque may be transmitted between the electric motor 42 and the wheel end shaft 80 of the wheel end assembly 44 via the first gear 400, the second gear 402, and the third gear 404. The clutch 420 does not couple the fifth gear 408 to the wheel end shaft 80 in the high speed position. As such, the fifth gear 408 may be decoupled from the wheel end shaft 80 such that the wheel end shaft 80 is rotatable with respect to the fifth gear 408. Although the second gear 402 may rotate the fourth gear 406, which in turn may rotate the fifth gear 408. Torque is not transmitted between the electric motor 42 and the wheel end shaft 80 of the wheel end assembly 44 via the fourth gear 406 and the fifth gear 408.

Referring to FIGS. 10A through 12B, another example of a reduction gear module 46 having a multi-speed configuration is shown. This configuration may include a first gear 400 second gear 402, third gear 404, a clutch 420, and a connection shaft 432 as previously described and as shown in FIGS. 7A through 9B. The fifth gear 408 may be fixedly mounted to the wheel end shaft 80 rather than rotatably mounted to the wheel end shaft 80. As such, the clutch 420 may selectively couple the third gear 404 to the wheel end shaft 80. The fourth gear 406 may be rotatably mounted to the connection shaft 432 rather than fixedly mounted to the connection shaft 432. A second clutch 420' may be provided that may facilitate coupling and decoupling of the fourth gear 406.

The second clutch 420' may selectively couple the fourth gear 406 to the connection shaft 432. The second clutch 420' may have any suitable configuration as previously described. In at least one configuration, the second clutch 420' may be configured to move along the third axis 430 and may be operatively connected to the actuator 350 such as with a linkage 452. The linkage 452 may be configured as a shift fork having a first fork portion 454 and a second fork portion 456. The first fork portion 454 may extend to the clutch 420. The second fork portion 456 may extend to the second clutch 420'. The second clutch 420' may be axially positioned along the third axis 430 between the second gear 402 and the fourth gear 406. As such, the clutch 420 and the second clutch 420' may be moved by a single actuator 350 that may simultaneously move the clutch 420 and the second clutch 420' in the same direction (i.e., left or right from the perspective shown) along the second axis 70 and the third axis 430, respectively.

Figure 10B:
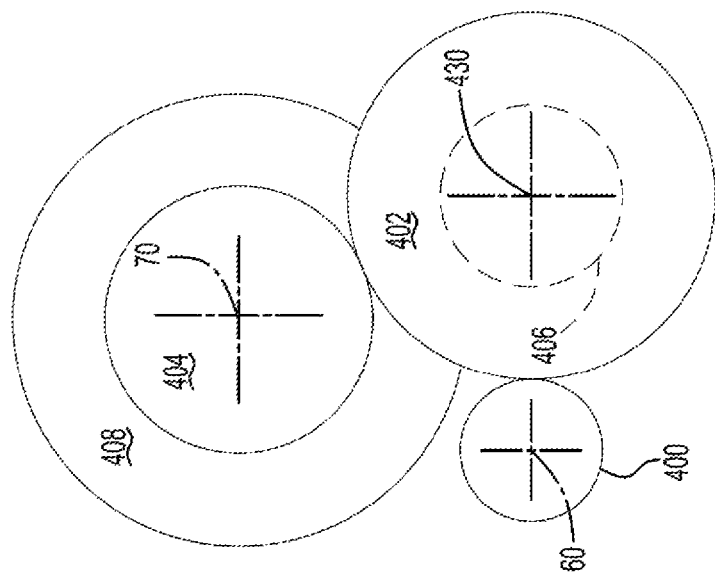
FIGS. 10A and 10B illustrate an example of an axle assembly that may be provided with the drive axle system with a clutch in a neutral position.
Figure 10A:
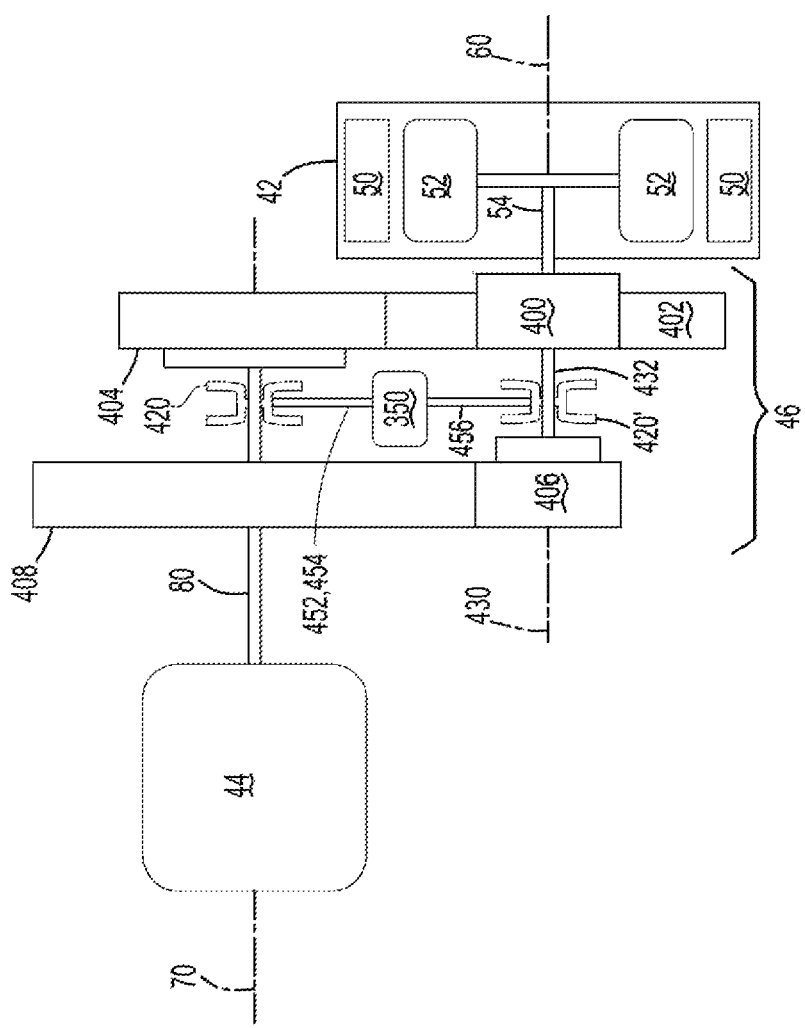

Referring to FIGS. 10A and 10B, the clutch 420 and the second clutch 420' are shown in neutral positions. The clutch 420 may not couple the third gear 404 to the wheel end shaft 80 when the clutch 420 is in the neutral position as previously described. As such, torque may not be transmitted between the electric motor 42 and the wheel end assembly 44 via the second gear 402 and the third gear 404 when the clutch 420 is in the neutral position. Similarly, the second clutch 420' may not couple the fourth gear 406 to the connection shaft 432 when the second clutch 420' is in its neutral position. As such, the fourth gear 406 may be decoupled from the connection shaft 432 such that the connection shaft 432 may be rotatable with respect to the fourth gear 406. Thus, torque may not be transmitted between the electric motor 42 and the wheel end assembly 44 via the fourth gear 406 and the fifth gear 408 when the second clutch 420' is in its neutral position.

Figure 11B:
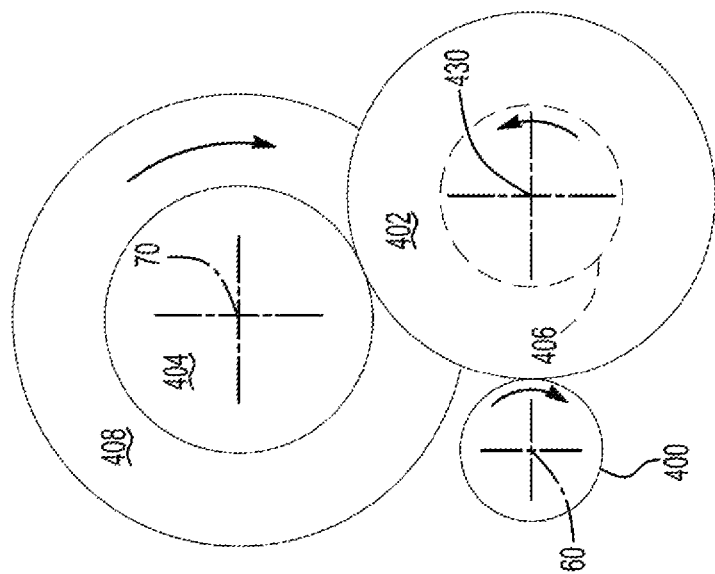
FIGS. 11A and 11B illustrate the axle assembly of FIGS. 10A and 10B with the clutch in a low speed position.
Figure 11A:
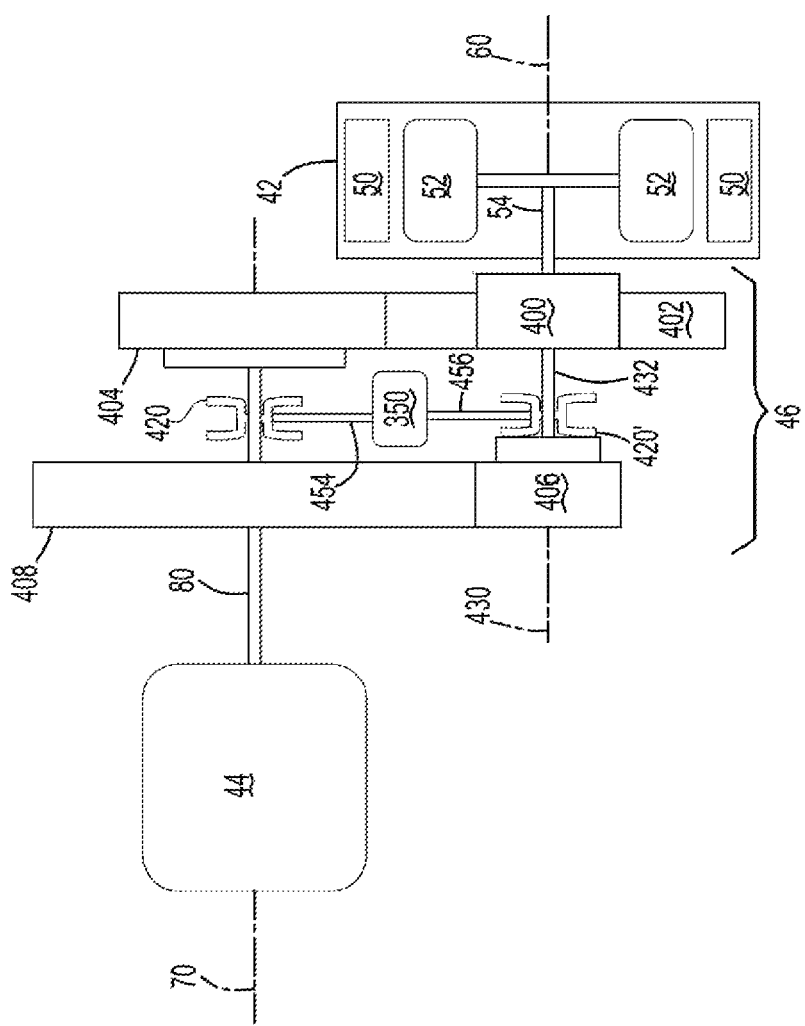

Referring to FIGS. 11A and 11B, the clutch 420 and the second clutch 420' are shown in the low speed position. The clutch 420 and the second clutch 420' may be moved to the low speed position by the actuator 350. In the low speed position, (a) the clutch 420 may move further left from the neutral position shown in FIG. 10A from the perspective shown but may remain in a neutral position in which the third gear 404 is decoupled from the wheel end shaft 80 and (b) the second clutch 420' may couple the fourth gear 406 to the connection shaft 432 such that the fourth gear 406 is rotatable about the third axis 430 with the connection shaft 432. Thus, torque may be transmitted between the electric motor 42 and the wheel end shaft 80 of the wheel end assembly 44 via the first gear 400, the second gear 402, the fourth gear 406, and the fifth gear 408. The clutch 420 does not couple the third gear 404 to the wheel end shaft 80 in the low speed position. As such, the third gear 404 may be decoupled from the wheel end shaft 80 such that the wheel end shaft 80 is rotatable with respect to the third gear 404. Although the second gear 402 may rotate the third gear 404, torque is not transmitted between the electric motor 42 and the wheel end shaft 80 of the wheel end assembly 44 via the second gear 402 and the third gear 404.

Figure 12B:
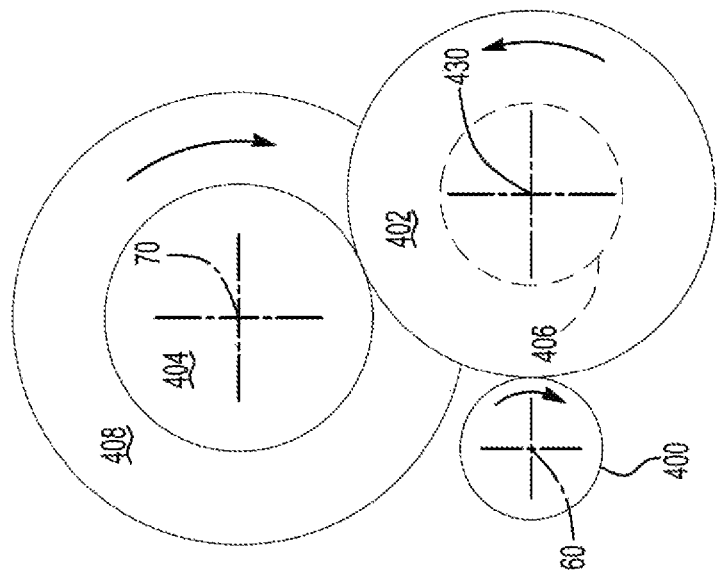
FIGS. 12A and 12B illustrate the axle assembly of FIGS. 10A and 10B with the clutch in a high speed position.
Figure 12A:
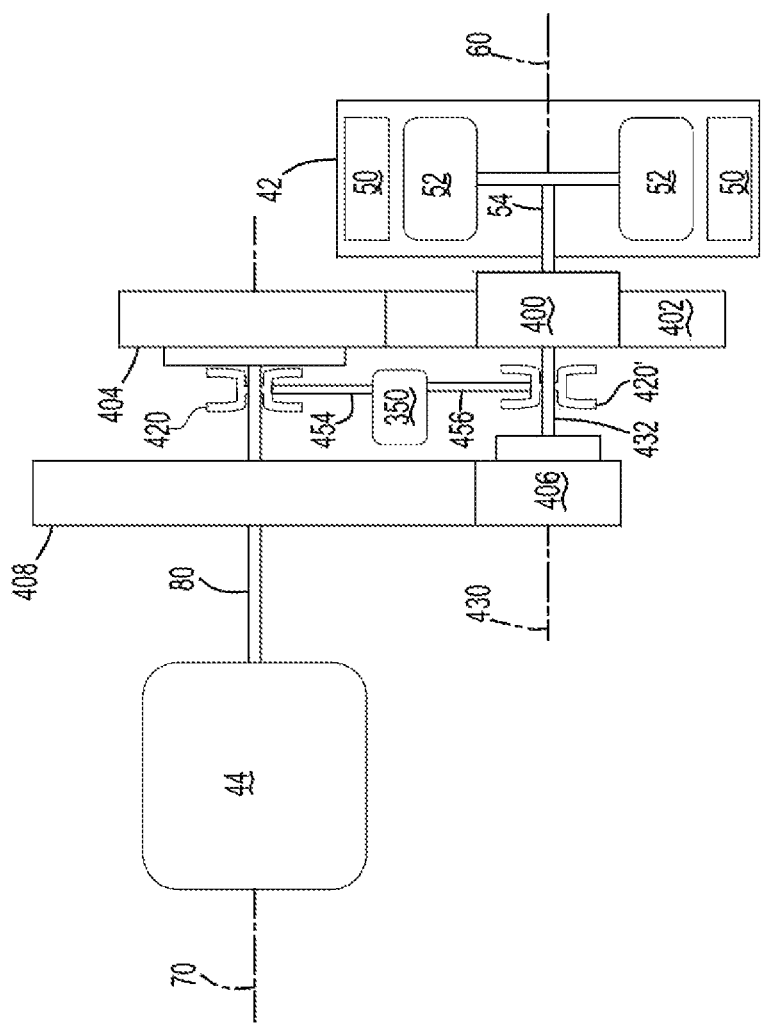

Referring to FIGS. 12A and 12B, the clutch 420 and the second clutch 420' are shown in their respective high speed positions. The clutch 420 and the second clutch 420' may be moved to their high speed positions by the actuator 350. In the high speed position, (a) the clutch 420 may couple the third gear 404 to the wheel end shaft 80 such that the third gear 404 is rotatable about the second axis 70 with the wheel end shaft 80 and (b) the second clutch 420' may move further right from the neutral position shown in FIG. 10A from the perspective shown but may remain in a neutral position in which the fourth gear 406 is decoupled from the connection shaft 432. Thus, torque may be transmitted between the electric motor and the wheel end shaft 80 of the wheel end assembly 44 via the first gear 400, the second gear 402, and the third gear 404. Torque is not transmitted between the electric motor 42 and the wheel end shaft 80 of the wheel end assembly 44 via the fourth gear 406 and the fifth gear 408.

Referring to FIGS. 13A through 15B, another example of a reduction gear module 46 having a multi speed configuration is shown. This configuration may include a first gear 500, a second gear 502, a third gear 504, a fourth gear 506, a fifth gear 508, and a sixth gear 510. The control system may include a clutch 520 and a second clutch 520'.

The first gear 500 may be rotatable about the first axis 60 with the rotor 52 and the rotor shaft 54. For instance, the first gear 500 may be fixedly disposed on the rotor shaft 54 such that the first gear 500 does not rotate about the first axis 60 with respect to the rotor shaft 54. The teeth of the first gear 500 may contact and may mate or mesh with teeth of the second gear 502 and teeth of the third gear 504.

The second gear 502 may be rotatable about a third axis 530. In at least one configuration, the second gear 502 may be rotatably disposed on a connection shaft 532. For instance, the second gear 502 may have a hole that may receive the connection shaft 532. The hole may also receive a bushing or bearing that may extend around the connection shaft 532 and that may rotatably support the second gear 502. The second gear 502 may be selectively coupled to the connection shaft 532 with the second clutch 520' as will be discussed in more detail below. The third axis 530 may be disposed below the second axis 70. In addition, the third axis 530 may be disposed above the first axis 60, below the first axis 60, or may be coplanar with the first axis 60 such that the first axis 60 and the third axis 530 may be disposed at a common distance or common height below the second axis 70. The second gear 502 may have a larger diameter than the first gear 500.

The third gear 504 may be rotatable about a fourth axis 540. For instance, the third gear 504 may be mounted to a second connection shaft 542 that may extend along and may be rotatable about the fourth axis 540. The third gear 504 may be fixedly disposed on the second connection shaft 542 such that the third gear 504 does not rotate about the fourth axis 540 with respect to the second connection shaft 542. The fourth axis 540 may be disposed above the first axis 60, the third axis 530, or both.

The fourth gear 506 may be rotatable about the third axis 530. For instance, the fourth gear 506 may be mounted to the connection shaft 532. The fourth gear 506 may be fixedly disposed on the connection shaft 532 such that the fourth gear 506 does not rotate about the third axis 530 with respect to the connection shaft 532. Alternatively, the fourth gear 506 may be fixedly mounted to the second gear 502 such that the connection shaft 532 may be omitted. The fourth gear 506 may be axially positioned along the third axis 530 further from the electric motor 42 than the second gear 502. Teeth of the fourth gear 506 may contact and mate or mesh with teeth of the sixth gear 510. The fourth gear 506 may have a larger diameter than the first gear 500, the third gear 504, the fifth gear 508, or combinations thereof.

The fifth gear 508 may be rotatable about the fourth axis 540. In at least one configuration, the fifth gear 508 may be rotatably disposed on the second connection shaft 542. For instance, the fifth gear 508 may have a hole that may receive the second connection shaft 542. The hole may also receive a bushing or bearing that may extend around the second connection shaft 542 and that may rotatably support the fifth gear 508. The fifth gear 508 may be selectively coupled to the second connection shaft 542 with the clutch 520 as will be discussed in more detail below.

The sixth gear 510 may be rotatable about the second axis 70. In at least one configuration, the sixth gear 510 may be fixedly disposed on the wheel end shaft 80. The sixth gear 510 may have a larger diameter than the first gear 500, the second gear 502, the third gear 504, the fourth gear 506, the fifth gear 508, or combinations thereof.

The clutch 520 may selectively couple the second gear 502 to the connection shaft 532. The second clutch 520' may selectively couple the fifth gear 508 to the second connection shaft 542. The clutch 520 and the second clutch 520' may be actuated with a common actuator 350 or different actuators 350, 350' as shown. A first linkage 352 may operatively connect the actuator 350 to the clutch 520. Similarly, a second linkage 352' may operatively connect the actuator 350' to the second clutch 520'.

Referring to FIGS. 13A and 13B, the clutch 520 and the second clutch 520' are shown in neutral positions. The clutch 520 may not couple the second gear 502 to the connection shaft 532 when the clutch 520 is in the neutral position. As such, torque may not be transmitted between the electric motor 42 and the wheel end assembly 44 via the second gear 502, the fourth gear 506, and the sixth gear 510 when the clutch 520 is in the neutral position. Similarly, the second clutch 520' may not couple the fifth gear 508 to the second connection shaft 542 when the second clutch 520' is in its neutral position. As such, the fifth gear 508 may be decoupled from the second connection shaft 542 such that the second connection shaft 542 may be rotatable with respect to the fifth gear 508. Thus, torque may not be transmitted between the electric motor 42 and the wheel end assembly via the third gear 504, the fifth gear 508, and the sixth gear 510 when the second clutch 520' is in its neutral position.

Referring to FIGS. 14A and 14B, the clutch 520 is shown in a low speed position. The clutch 520 may be moved to the low speed position by the actuator 350. In the low speed position, the clutch 520 may move further right from the neutral position shown in FIG. 13A from the perspective shown and may couple the second gear 502 to the connection shaft 532 such that the second gear 502 is rotatable about the third axis 530 with the connection shaft 532. Thus, torque may be transmitted between the electric motor 42 and the wheel end shaft 80 of the wheel end assembly 44 via the first gear 500, the second gear 502, the fourth gear 506, and the sixth gear 510 at a low speed ratio. The second clutch 520' may be positioned in its neutral position. As such, the fifth gear 508 may be decoupled from the second connection shaft 542 such that the second connection shaft 542 is rotatable with respect to the fifth gear 508. Although the first gear 500 may rotate the third gear 504, torque is not transmitted between the electric motor 42 and the wheel end shaft 80 of the wheel end assembly 44 via the third gear 504 and the fifth gear 508 since the fifth gear 508 is decoupled from the second connection shaft 542.

Referring to FIGS. 15A and 15B, the second clutch 520' is shown in the high speed position. The second clutch 520' may be moved to the high speed position by the second actuator 350'. In the high speed position, the second clutch 520' may move further left from its neutral position shown in FIG. 13A from the perspective shown and may couple the fifth gear 508 to the second connection shaft 542 such that the fifth gear 508 is rotatable about the fourth axis 540 with the second connection shaft 542. Thus, torque may be transmitted between the electric motor 42 and the wheel end shaft 80 of the wheel end assembly 44 via the first gear 500, the third gear 504, the fifth gear 508, and the sixth gear 510 at a higher gear ratio or higher speed than the low gear ratio or lower speed associated with the low speed position. The clutch 520 may be positioned in in its neutral position. As such, the second gear 502 may be decoupled from the connection shaft 532 such that the connection shaft 532 is rotatable with respect to the second gear 502. Although the first gear 500 may rotate the second gear 502, torque is not transmitted between the electric motor 42 and the wheel end shaft 80 of the wheel end assembly 44 via the second gear 502 and the fourth gear 506 since the second gear 502 is decoupled from the connection shaft 532. As a nonlimiting example, gear ratios may be provided in ranges of 17:1 to 27:1, thereby providing a greater range of potential gear ratios.

The control system 48 may control operation of the axle assembly 24. The control system 48 may include one or more electronic controllers, such as a microprocessor-based controller, that may monitor and/or control operation of various components of the axle assembly 24, such as the electric motor 42. In addition, the control system 48 coupling in decoupling of components of the reduction gear module 46 in configurations that may provide multiple speeds. For instance, the control system 48 may control operation of the clutches previously discussed that may couple/decouple one or more gears from a corresponding shaft.

The configurations discussed above may allow axle assemblies to be provided with different gear ratio ranges, which may allow an axle assembly to be provided that is tailored to the expected duty cycle of a vehicle. In addition, the location of the first axis, the second axis, or both may be standardized to allow different motors or reduction gear arrangements to be provided on a common platform such that different size motors may be compatible with a drive axle system. For instance, the location of the first axis, second axis, and wheel end assembly may be standardized for use with different size motors and/or reduction gear modules. Moreover, the axle assemblies may be provided with a more compact arrangement in an axial direction, which may allow aisle width to be maintained or possibly increased.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An axle assembly comprising:
   an electric motor that comprises a rotor and a rotor shaft, wherein the rotor is fixedly mounted to the rotor shaft such that the rotor and the rotor shaft are rotatable about a first axis;
   a wheel end assembly that is rotatable about a second axis that is disposed above the first axis, wherein the wheel end assembly includes a wheel hub that is adapted to facilitate mounting of a wheel and a wheel end shaft that is operatively connected to the wheel hub and is rotatable about the second axis; and
   a reduction gear module comprising a plurality of gears configured to transmit torque between the electric motor and the wheel end assembly, wherein the reduction gear module provides multiple reductions and comprises:
   a first gear that is fixedly disposed on the rotor shaft such that the first gear and the rotor shaft are rotatable together about the first axis and are not rotatable with respect to each other;
   a second gear that meshes with the first gear and is rotatable about a third axis, the second gear being fixedly disposed on a connection shaft such that the second gear and the connection shaft are rotatable together about the third axis and are not rotatable with respect to each other;
   a third gear that is rotatable about the third axis with the second gear, the third gear being fixedly disposed on the connection shaft such that the third gear and the connection shaft are rotatable together about the third axis and are not rotatable with respect to each other; and
   a fourth gear that meshes with the third gear, the fourth gear being fixedly disposed on the wheel end shaft such that the fourth gear and the wheel end shaft are rotatable together about the second axis and are not rotatable with respect to each other.

2. The axle assembly of claim 1 wherein the second gear has a larger diameter than the first gear.

3. The axle assembly of claim 1 wherein the fourth gear has a larger diameter than the third gear.

4. The axle assembly of claim 1 wherein the second axis is disposed above the third axis.

5. The axle assembly of claim 4 wherein the second axis is disposed above the first axis.

6. The axle assembly of claim 1 wherein the second axis is disposed above the first axis.

7. The axle assembly of claim 1 wherein the second gear is spaced apart from the third gear.

8. The axle assembly of claim 1 wherein the second gear is axially positioned between the electric motor and the third gear.

9. The axle assembly of claim 1 wherein the first gear and the second gear are positioned closer to the electric motor than the third gear and the fourth gear.

10. The axle assembly of claim 1 wherein the third gear and the fourth gear are positioned closer to the wheel end assembly than the first gear and the second gear.

11. The axle assembly of claim 10 wherein the first gear, the second gear, and the third gear are positioned below the second axis.

12. The axle assembly of claim 1 wherein the first gear, the second gear, and the third gear are positioned below the second axis.

13. The axle assembly of claim 1 wherein the electric motor is completely disposed below the second axis.

14. The axle assembly of claim 1 wherein the rotor and the rotor shaft are not rotatable with respect to each other.

15. The axle assembly of claim 14 wherein the second gear is spaced apart from the third gear.

16. The axle assembly of claim 14 wherein the first gear, the second gear, and the third gear are positioned below the second axis.

17. The axle assembly of claim 16 wherein the electric motor is completely disposed below the second axis.

* * * * *